US012578557B2

(12) United States Patent
Kimura

(10) Patent No.: US 12,578,557 B2
(45) Date of Patent: Mar. 17, 2026

(54) OPTICAL SYSTEM AND IMAGE PICKUP APPARATUS

(71) Applicant: CANON KABUSHIKI KAISHA, Tokyo (JP)

(72) Inventor: Kohei Kimura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 931 days.

(21) Appl. No.: 17/729,087

(22) Filed: Apr. 26, 2022

(65) Prior Publication Data

US 2022/0365320 A1      Nov. 17, 2022

(30) Foreign Application Priority Data

May 14, 2021    (JP) ................................. 2021-082159

(51) Int. Cl.
| | |
|---|---|
| *G02B 13/00* | (2006.01) |
| *G02B 3/00* | (2006.01) |
| *G02B 9/64* | (2006.01) |
| *G03B 5/02* | (2021.01) |

(52) U.S. Cl.
CPC ......... *G02B 13/006* (2013.01); *G02B 3/0043* (2013.01); *G02B 9/64* (2013.01); *G03B 5/02* (2013.01); *G03B 2205/0007* (2013.01)

(58) Field of Classification Search
CPC ...... G02B 13/006; G02B 3/0043; G02B 9/64; G02B 15/1451; G02B 27/646; G02B 15/1461; G02B 13/00; G03B 5/02; G03B 2205/0007; G03B 2205/0046
See application file for complete search history.

(56) References Cited

U.S. PATENT DOCUMENTS

| | | | |
|---|---|---|---|
| 10,215,972 B2 | 2/2019 | Gyoda et al. | |
| 10,222,594 B2 | 3/2019 | Kimura | |
| 10,670,834 B2 | 6/2020 | Kimura | |
| 11,314,064 B2 | 4/2022 | Kimura et al. | |
| 2010/0238562 A1* | 9/2010 | Take ...................... | G03B 17/17 |
| | | | 359/687 |
| 2011/0149119 A1* | 6/2011 | Matsui ........... | G02B 15/145129 |
| | | | 359/683 |
| 2013/0194487 A1* | 8/2013 | Eguchi ..................... | G02B 9/12 |
| | | | 359/784 |
| 2013/0321689 A1* | 12/2013 | Toyoda ................ | G02B 27/646 |
| | | | 359/683 |

(Continued)

FOREIGN PATENT DOCUMENTS

| | | |
|---|---|---|
| JP | 2008-026558 A | 2/2008 |
| JP | 2008-152049 A | 7/2008 |

(Continued)

OTHER PUBLICATIONS

Herbert, Gross, Handbook of Optical Systems, 2007 (Year: 2007).*

(Continued)

*Primary Examiner* — Pinping Sun
*Assistant Examiner* — Gabriel A Sanz
(74) *Attorney, Agent, or Firm* — Carter, DeLuca & Farrell LLP

(57) ABSTRACT

An optical system includes a movable unit movable in a direction eccentric to an optical axis. The movable unit includes a resin layer and a lens cemented together and satisfies a predetermined condition.

15 Claims, 23 Drawing Sheets

(56) References Cited

U.S. PATENT DOCUMENTS

| | | | | |
|---|---|---|---|---|
| 2017/0254991 A1 * | 9/2017 | Gyoda | .................... | G02B 15/16 |
| 2019/0377168 A1 * | 12/2019 | Umeda | .......... | G02B 15/145121 |
| 2020/0257095 A1 | 8/2020 | Kimura et al. | | |
| 2021/0356722 A1 | 11/2021 | Kimura | | |
| 2021/0364768 A1 * | 11/2021 | Nagami | ............. | G02B 15/1461 |
| 2022/0269055 A1 * | 8/2022 | Yamashita | ............... | G02B 9/64 |

FOREIGN PATENT DOCUMENTS

| | | | |
|---|---|---|---|
| JP | 2008-304952 | A | 12/2008 |
| JP | 2009-244445 | A | 10/2009 |
| JP | 2014-021349 | A | 2/2014 |
| JP | 2014-126678 | A | 7/2014 |
| JP | 2019-61184 | A | 4/2019 |
| JP | 2020-086328 | A | 6/2020 |
| JP | 2020-086331 | A | 6/2020 |
| JP | 2020-106681 | A | 7/2020 |

OTHER PUBLICATIONS

Notice of Reasons for Refusal issued by the Japanese Patent Office on Mar. 4, 2025 in corresponding JP Patent Application No. 2021-082159, with English translation.

* cited by examiner

OPTICAL SYSTEM AND IMAGE PICKUP APPARATUS

BACKGROUND OF THE INVENTION

Field of the Invention

The present invention relates to an optical system having a movable unit that is movable in a direction eccentric to an optical axis.

Description of the Related Art

An optical system for an image pickup apparatus can reduce (or correct) an image blur caused by a shake of the image pickup apparatus due to a camera shake or the like, by moving (or shifting) a lens or lens unit as an image stabilizing unit in a direction eccentric to the optical axis. Each of Japanese Patent Laid-Open Nos. ("JPs") 2020-106681 and 2020-086331 discloses an optical system that shifts part of an intermediate lens unit as an image stabilizing unit in a direction orthogonal to an optical axis. More specifically, JP 2020-106681 discloses a positive lead type zoom lens (optical system) that consists of, in order from an object side to an image side, first to fifth lens units as positive, negative, positive, negative, and positive lens units, w % herein the entire third lens unit is an image stabilizing unit. JP 2020-086331 discloses a positive lead type zoom lens (optical system) that consists of, in order from the object side to the image side, first to seventh lens units as positive, negative, positive, negative, positive, negative, and positive lens units, wherein a fourth lens unit consists of a cemented lens made by cementing two negative lenses and entirely serves as an image stabilizing unit.

In the optical system disclosed in JP 2020-106681, the third lens unit as the image stabilizing unit consists of four lenses, that is, positive, negative, positive, and negative lenses arranged in this order from the object side and is heavy. Thus, a driving mechanism for shifting the entire third lens unit relative to the optical axis becomes larger, and a lens barrel accommodating the (imaging) optical system becomes consequently larger. In the (imaging) optical system disclosed in JP 2020-086331, the fourth lens unit as the image stabilizing unit consists of two lenses and thus is small and lightweight, but it is difficult to suppress a chromatic aberration while the fourth lens unit is shifted.

SUMMARY OF THE INVENTION

The present invention provides an optical system and an image pickup apparatus, each of which can suppress a chromatic aberration caused by a movable unit that can be decentered from an optical axis w % bile the movable unit is maintained small and lightweight.

An optical system according to one aspect of the present invention includes a movable unit movable in a direction eccentric to an optical axis. The movable unit includes a resin layer and a lens cemented together. The following condition is satisfied:

$$-0.30 \leq f_{is}/f_r \leq -0.05$$

where $f_r$ is a focal length of the resin layer, and $f_{is}$ is a focal length of the movable unit.

An image pickup apparatus according to another aspect of the present invention includes the above optical system, and an image sensor configured to image an object via the optical system.

Further features of the present invention will become apparent from the following description of exemplary embodiments with reference to the attached drawings.

DESCRIPTION OF THE EMBODIMENTS

Figure 1:
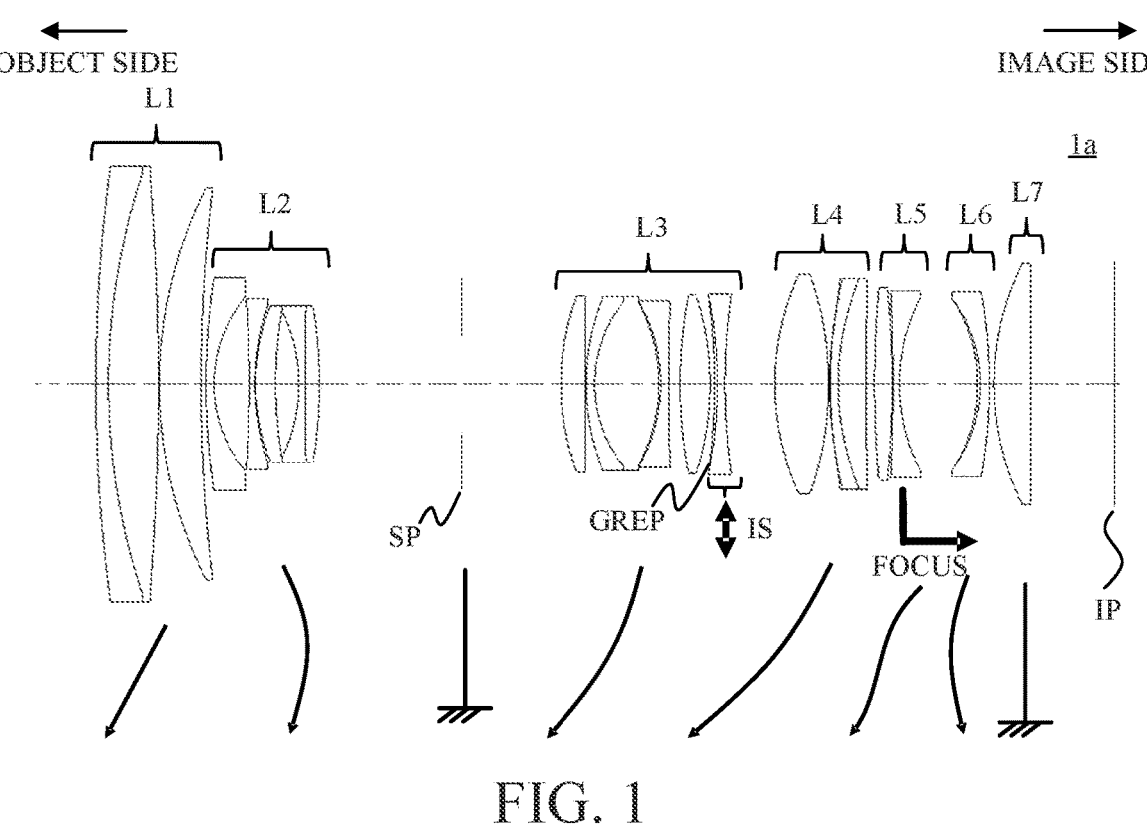
FIG. 1 is a sectional view of a zoom lens according to Example 1 at a wide-angle end.
Figure 2A:
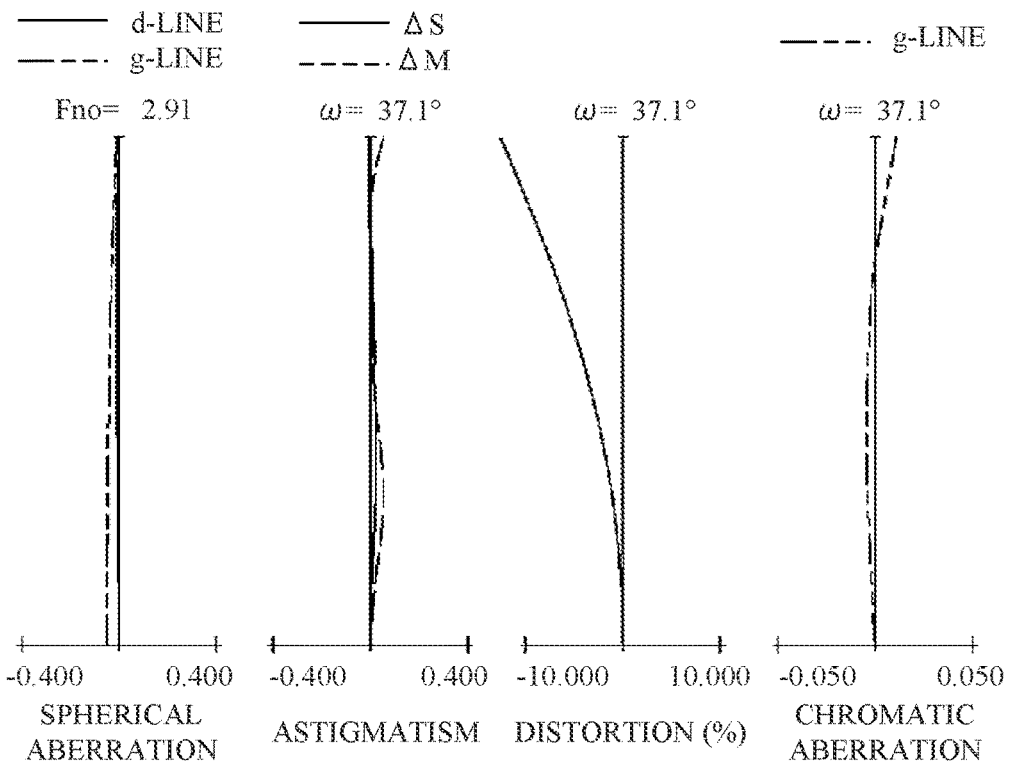
FIGS. 2A to 2C are longitudinal aberration diagrams of the zoom lens according to Example 1 at the wide-angle end, an intermediate (or middle) zoom position, and a telephoto end, respectively.
Figures 2B, 2C:
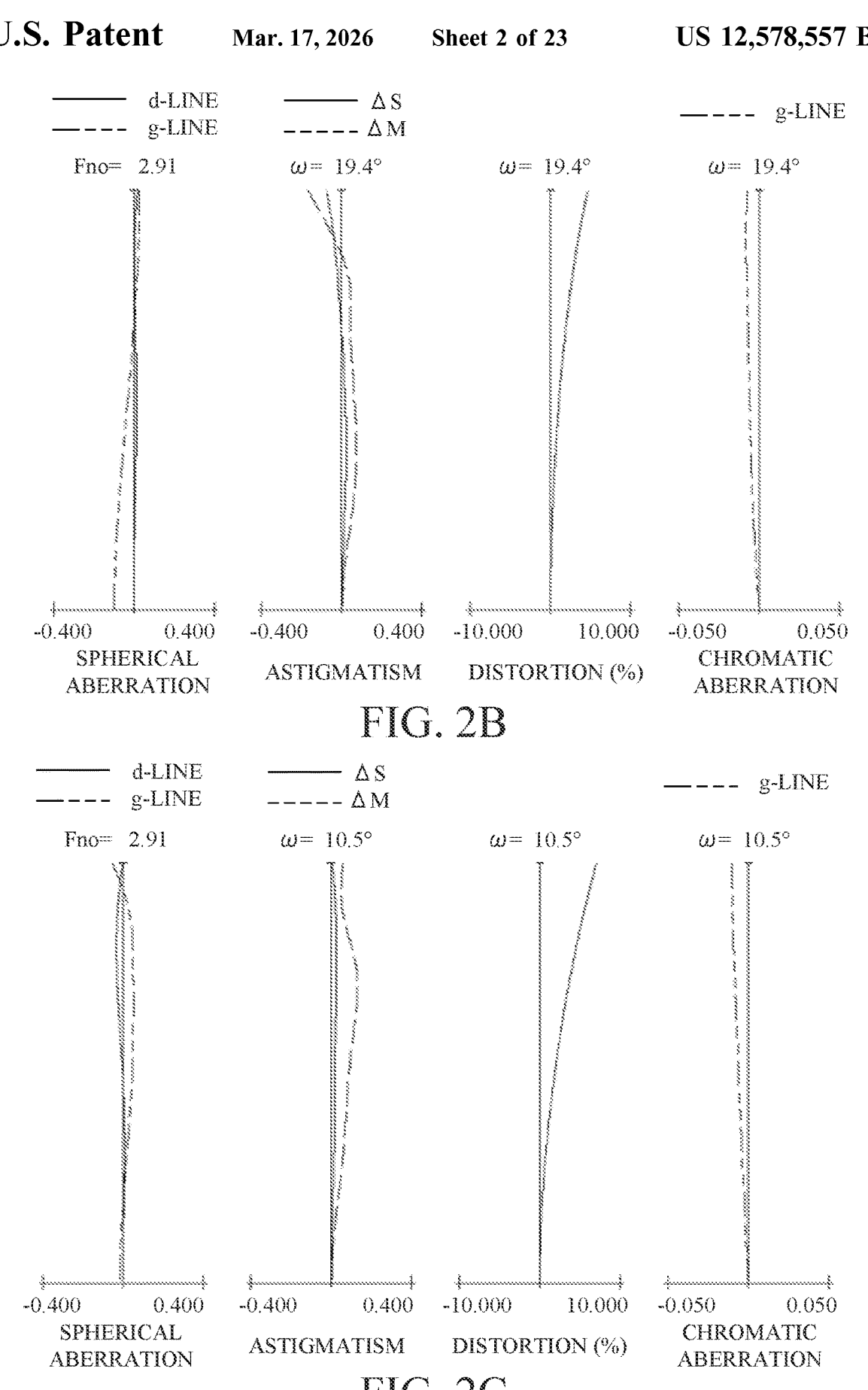
Figure 3A:
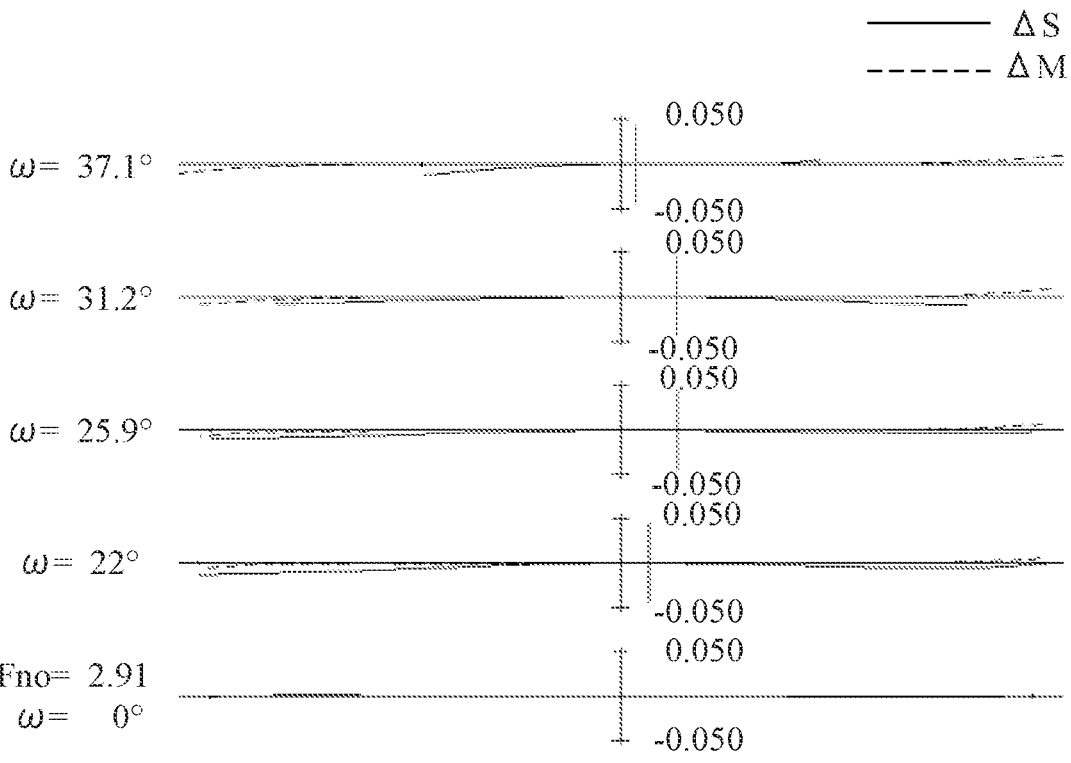
FIGS. 3A to 3C are lateral aberration diagrams of the zoom lens according to Example 1 at the wide-angle end, the intermediate zoom position, and the telephoto end, respectively.
Figure 3B:
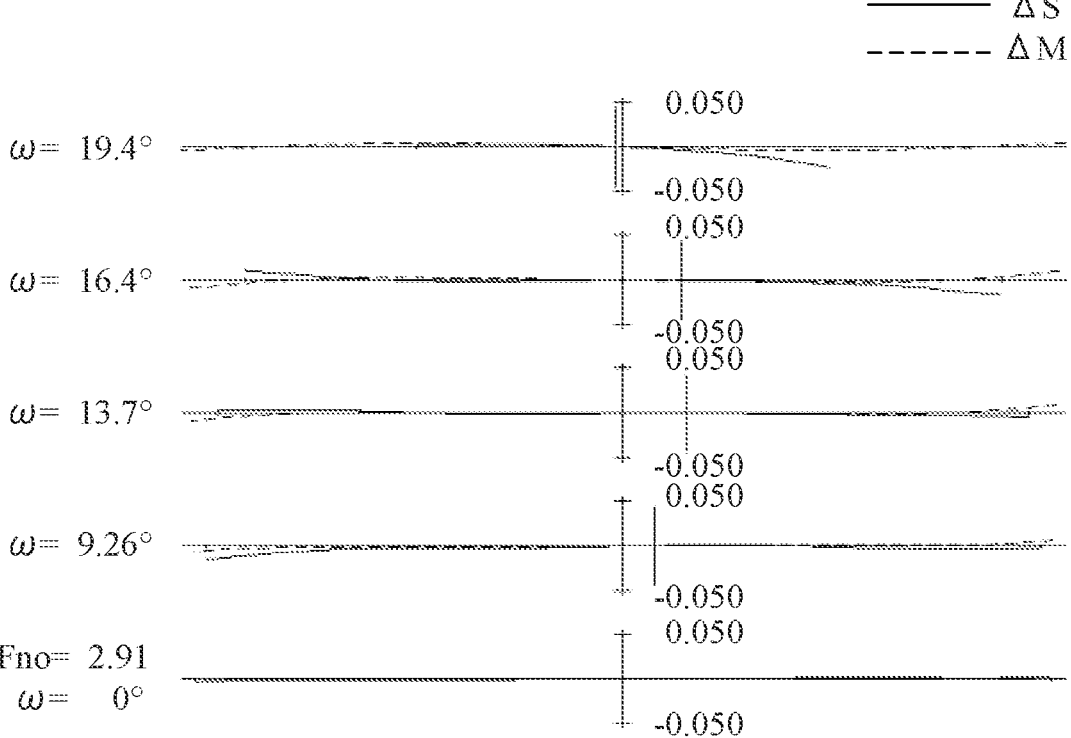
Figure 3C:
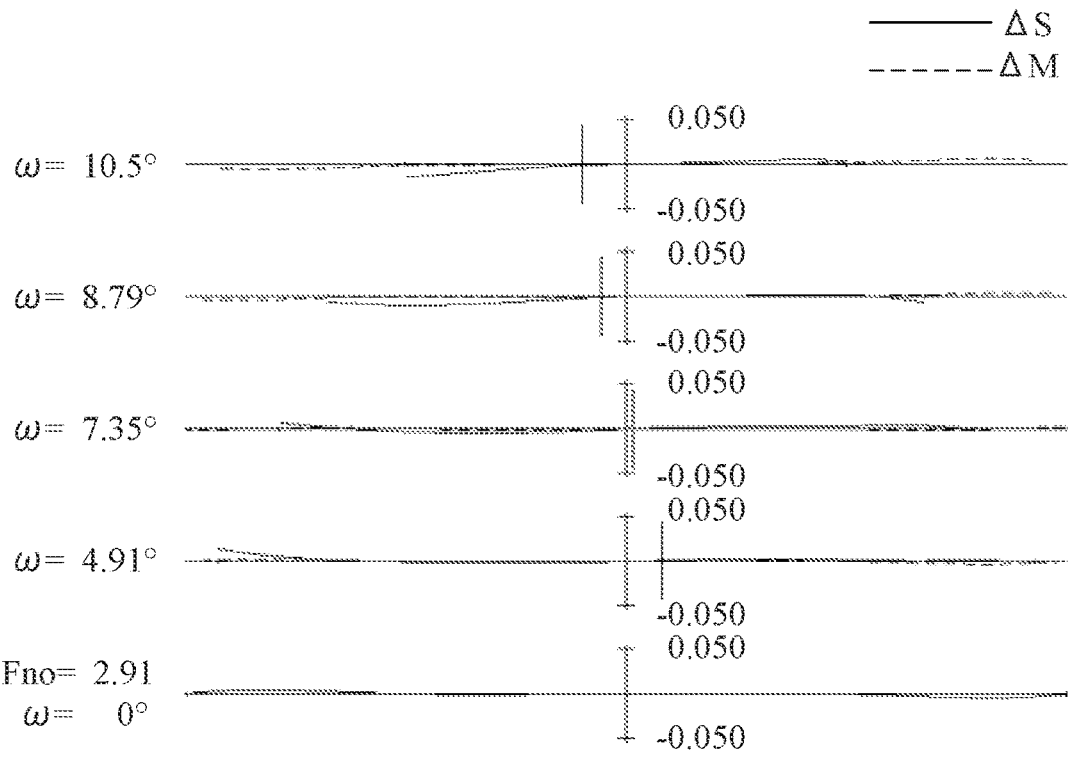
Figure 4A:
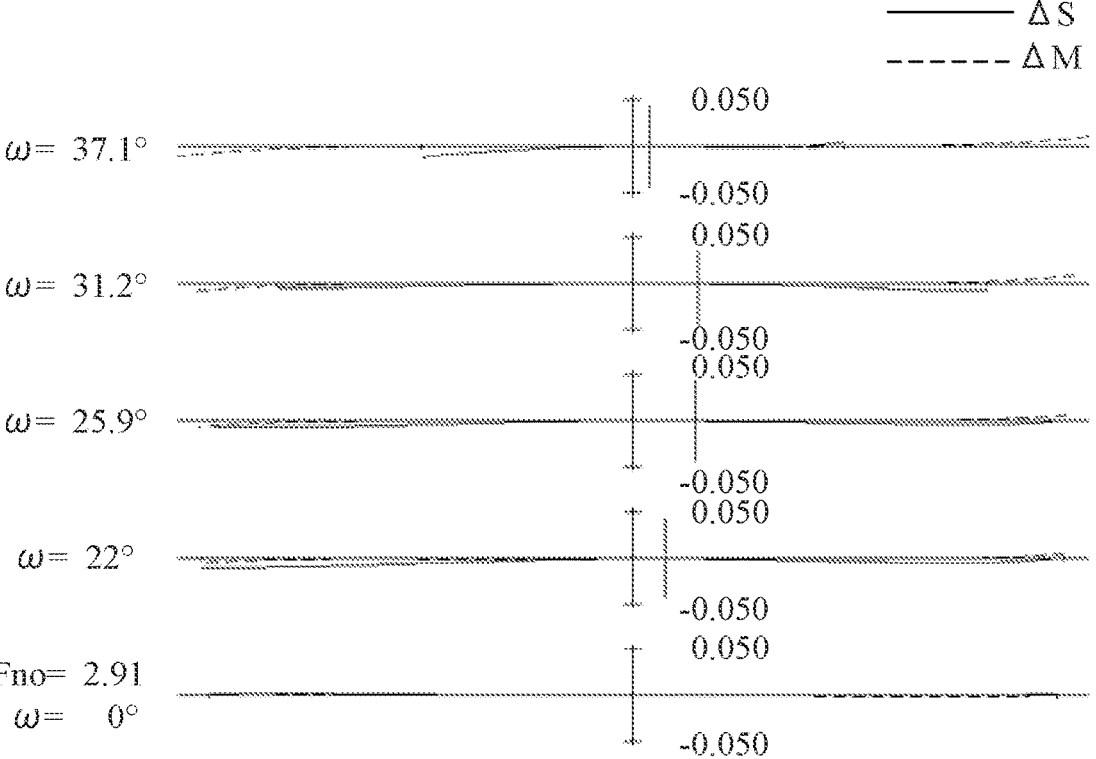
FIGS. 4A to 4C are lateral aberration diagrams of the zoom lens according to Example 1 at the wide-angle end, the intermediate zoom position, and the telephoto end, respectively, in image stabilization by 0.3 degrees.
Figures 4B, 4C:
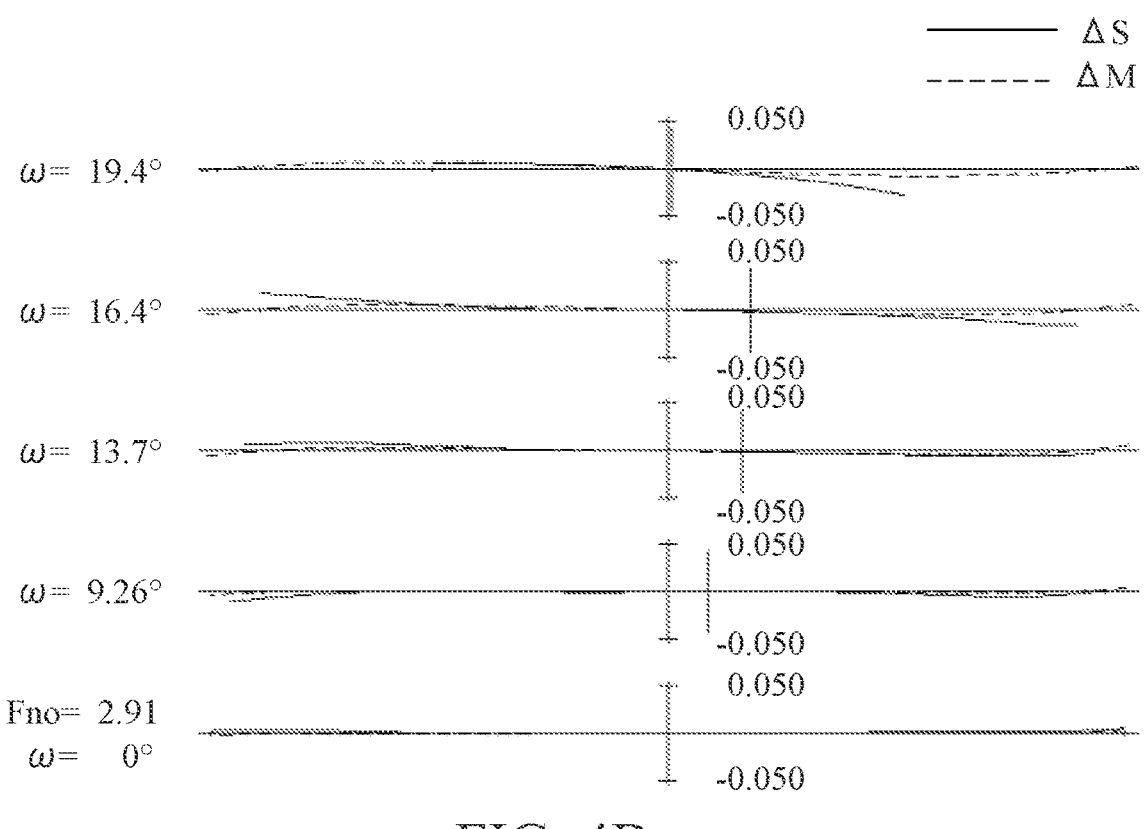

Referring now to the accompanying drawings, a description will be given of embodiments according to the present invention.

A description will now be given of matters common to each example before specific examples are explained. An optical system according to each example includes a plurality of lens units. In each example, the lens unit includes a single lens or a plurality of lenses. A distance between adjacent lens units varies during at least one of zooming and focusing. One of the lens units is an image stabilizing unit that serves as a movable unit configured to move (shift) in a direction including a component orthogonal to an optical axis (eccentric or decentering direction) to reduce (correct) an image blur. The image stabilizing unit includes a cemented lens in which a resin layer having a refractive power and a base lens are cemented (adhered) together.

The image stabilizing unit may be rotated in the direction including a component orthogonal to the optical axis about a rotation center on the optical axis. That is, the image stabilizing unit may be moved in the direction eccentric to the optical axis. In each example, the movable unit is moved in order to correct the image blur, but the movable unit is moved for a purpose other than the image stabilization, such as tilting imaging and following a moving object during moving object imaging.

Each of optical systems according to Examples 1 to 3 and 5 constitutes a zoom lens having a variable focal length, and an optical system according to Example 4 is a fixed focal length lens whose focal length does not change. In a zoom lens, a lens unit is a group of one or more lenses that is/are moved integrally during zooming between a wide-angle end and a telephoto end, and the distance between adjacent lens units changes during zooming. The lens unit may include a diaphragm (aperture stop). The wide-angle end and the telephoto end indicate zooming states of a maximum angle of view (minimum focal length) and a minimum angle of view (maximum focal length) when the lens unit movable during zooming is located at both ends of a mechanically or controllably movable range on the optical axis, respectively. In a fixed focal length lens, a lens unit is defined as a group of lenses divided before and after the diaphragm, a group of movable lenses such as the image stabilizing unit, and a group of lenses divided before and after the image stabilizing unit. Specific numerical examples 1 to 5 corresponding to Examples 1 to 5 will be described below.

FIGS. 1, 5, 9, and 17 illustrate sections of zoom lenses (also simply referred to as lenses hereinafter) $1a$, $1b$, $1c$, and $1e$ according to Examples 1 to 3 and 5 in in-focus states at infinity at the wide-angle ends. The zoom lens $1a$ according to Example 1 (numerical example 1) has a zoom ratio of 4.7 times, and an F-number of about 2.9. The zoom lens $1a$ has a half-angle of view of 37 degrees at the wide-angle end, and a half-angle of view of 11 degrees at the telephoto end. The zoom lens $1b$ according to Example 2 (numerical example 2) has a zoom ratio of 4.7 times, and an F-number of about 2.9. The zoom lens $1b$ has a half-angle of view of 37 degrees at the wide-angle end, and a half-angle of view of 11 degrees at the telephoto end. The zoom lens $1c$ according to Example 3 (numerical example 3) has a zoom ratio of 4.7 times, and an F-number of about 2.9. The zoom lens $1c$ has a half-angle of view of 37 degrees at the wide-angle end, and a half-angle of view of 11 degrees at the telephoto end. The zoom lens $1e$ according to Example 5 (numerical example 5) has a zoom ratio of 3.8 times, and an F-number of about 4.6 to 7.3. The zoom lens $1e$ has a half-angle of view of 12 degrees at the wide-angle end, and a half-angle of view of 3 degrees at the telephoto end.

FIGS. 2A to 2C, 6A to 6C, 10A to 10C, and 18A to 18C illustrate longitudinal aberrations of the zoom lenses $1a$, $1b$, $1c$, and $1e$ according to Examples 1 to 3 and 5 at the wide-angle ends, intermediate (or middle) zoom positions, and telephoto ends, respectively. FIGS. 3A to 3C, 7A to 7C, 11A to 11C, and 19A to 19C illustrate lateral aberrations of the zoom lenses $1a$, $1b$, $1c$, and $1e$ at the wide-angle ends, intermediate zoom positions, and the telephoto ends, respectively. FIGS. 4A to 4C, 8A to 8C, 12A to 12C, and 20A to 20C illustrate lateral aberrations of the zoom lenses $1a$, $1b$, $1c$, and $1e$ at the wide-angle ends, intermediate zoom positions, and telephoto ends, respectively, while the image stabilizing unit is shifted to a position for correcting an angular shake by 0.3 degrees.

Figure 13:
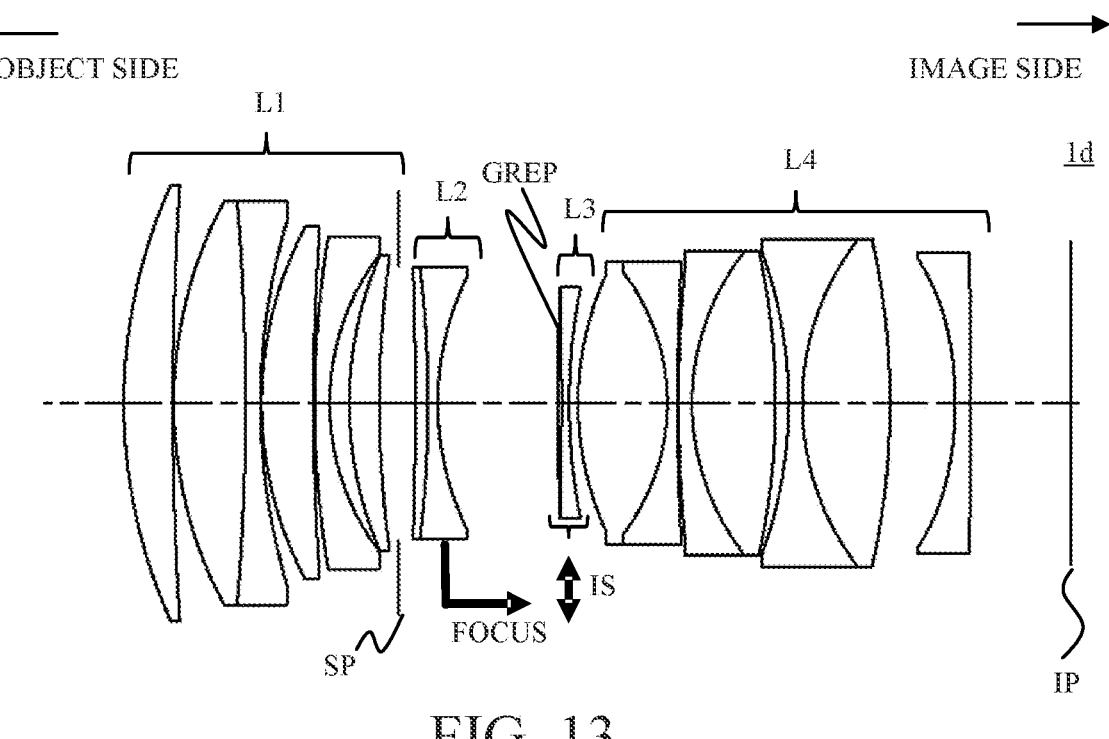
FIG. 13 is a sectional view of a fixed focal length lens (unifocal lens) according to Example 4.
Figure 14:
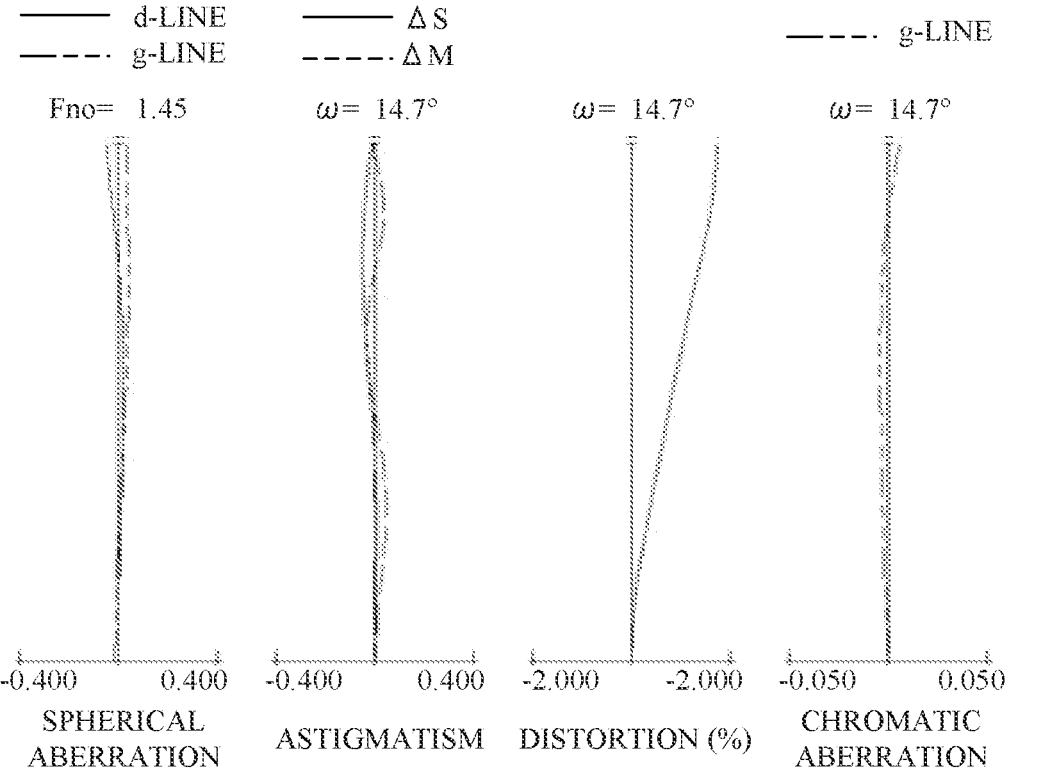
FIG. 14 is a longitudinal aberration diagram of the fixed focal length lens according to Example 4.
Figure 15:
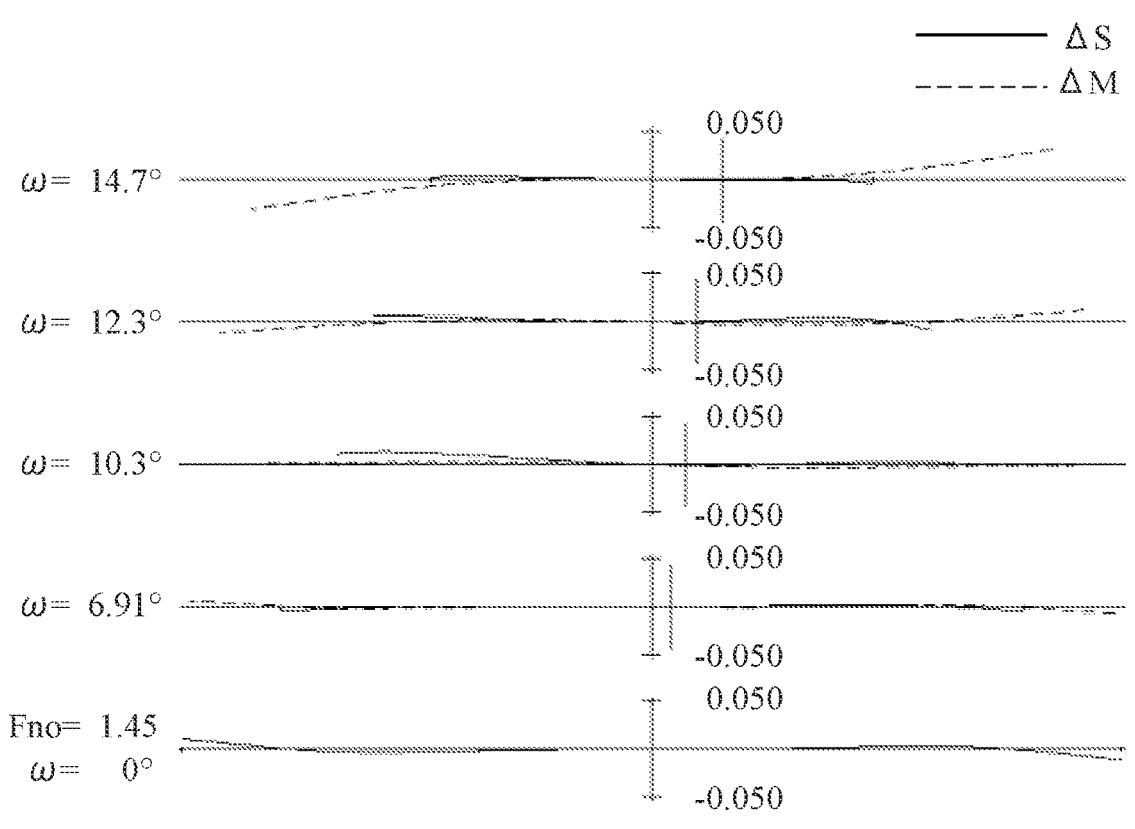
FIG. 15 is a lateral aberration diagram of the fixed focal length lens according to Example 4.
Figure 16:
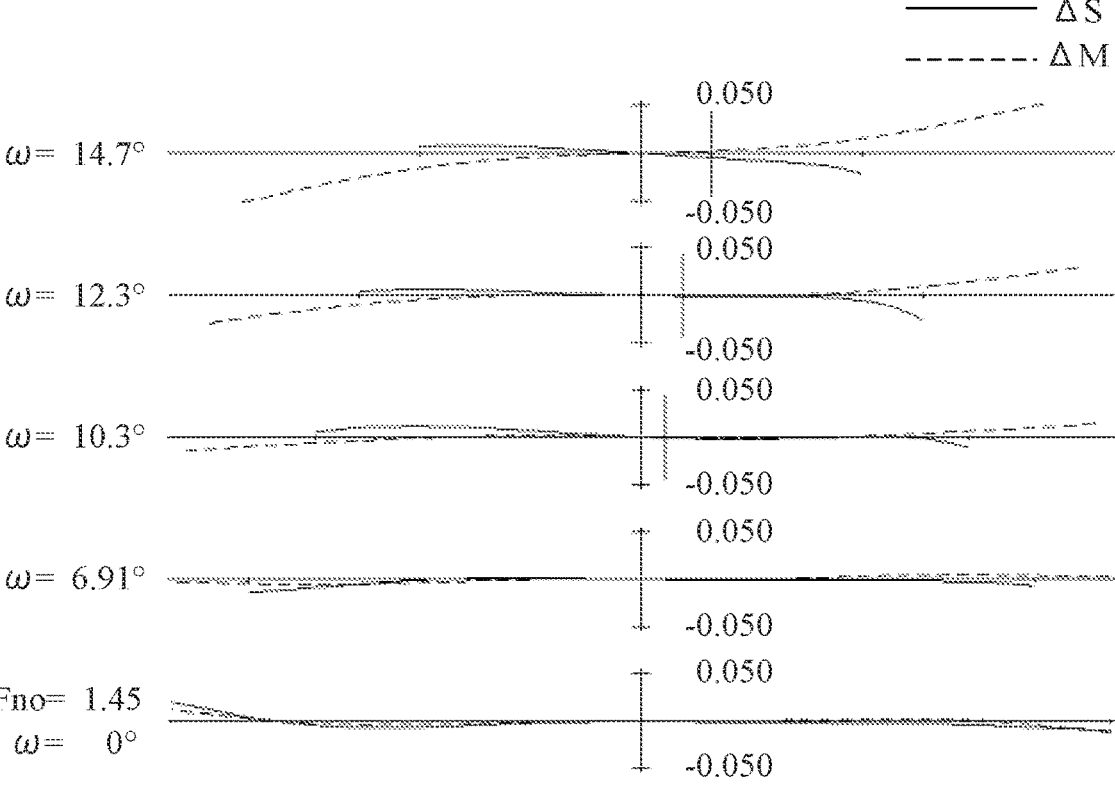
FIG. 16 is a lateral aberration diagram of the zoom lens according to Example 4 in image stabilization by 0.3 degrees.
Figures 17, 18A:
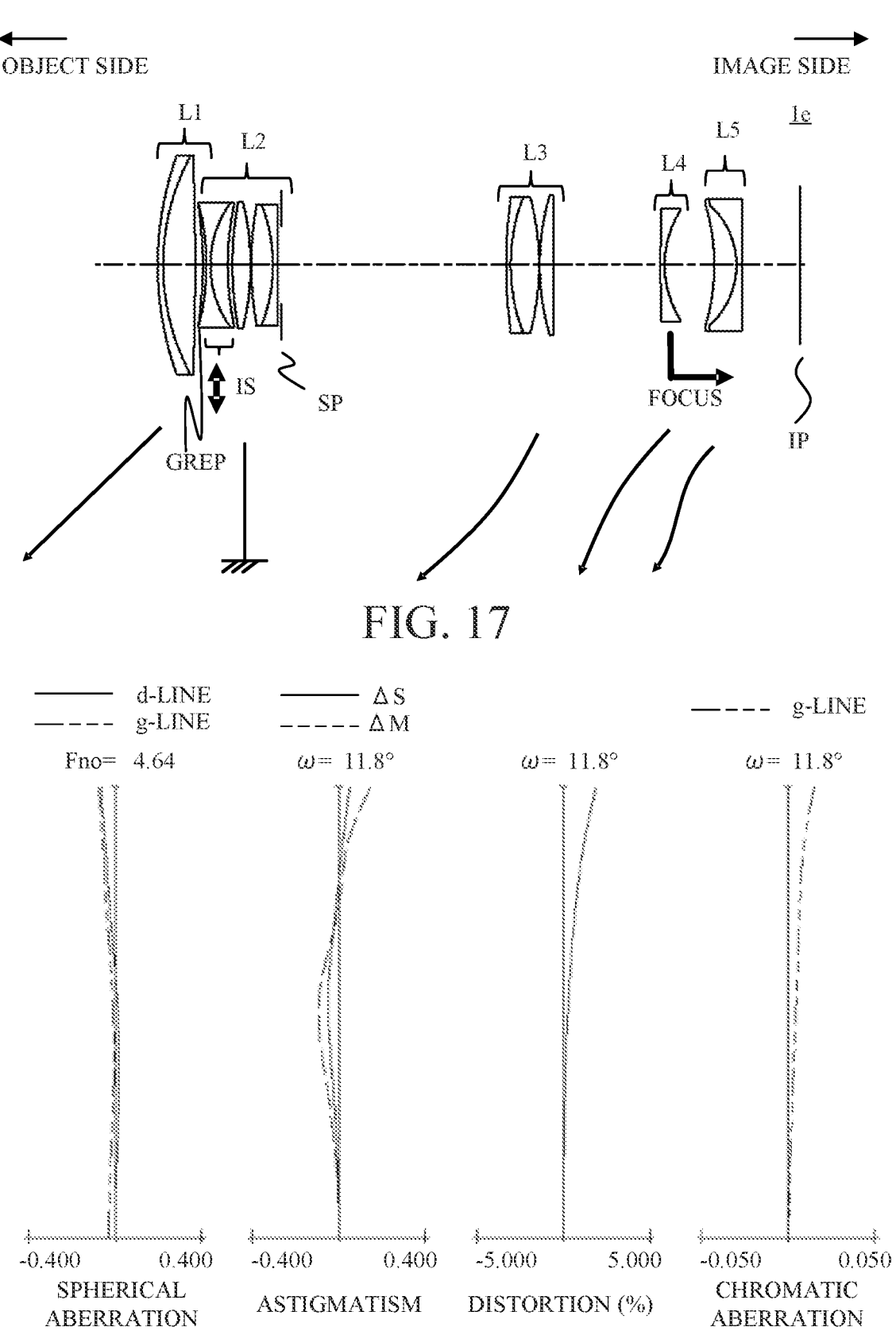
FIG. 17 is a sectional view of a zoom lens according to Example 5 at a wide-angle end.
FIGS. 18A to 18C are longitudinal aberration diagrams of the zoom lens according to Example 5 at the wide-angle end, an intermediate zoom position, and a telephoto end, respectively.
Figures 18B, 18C:
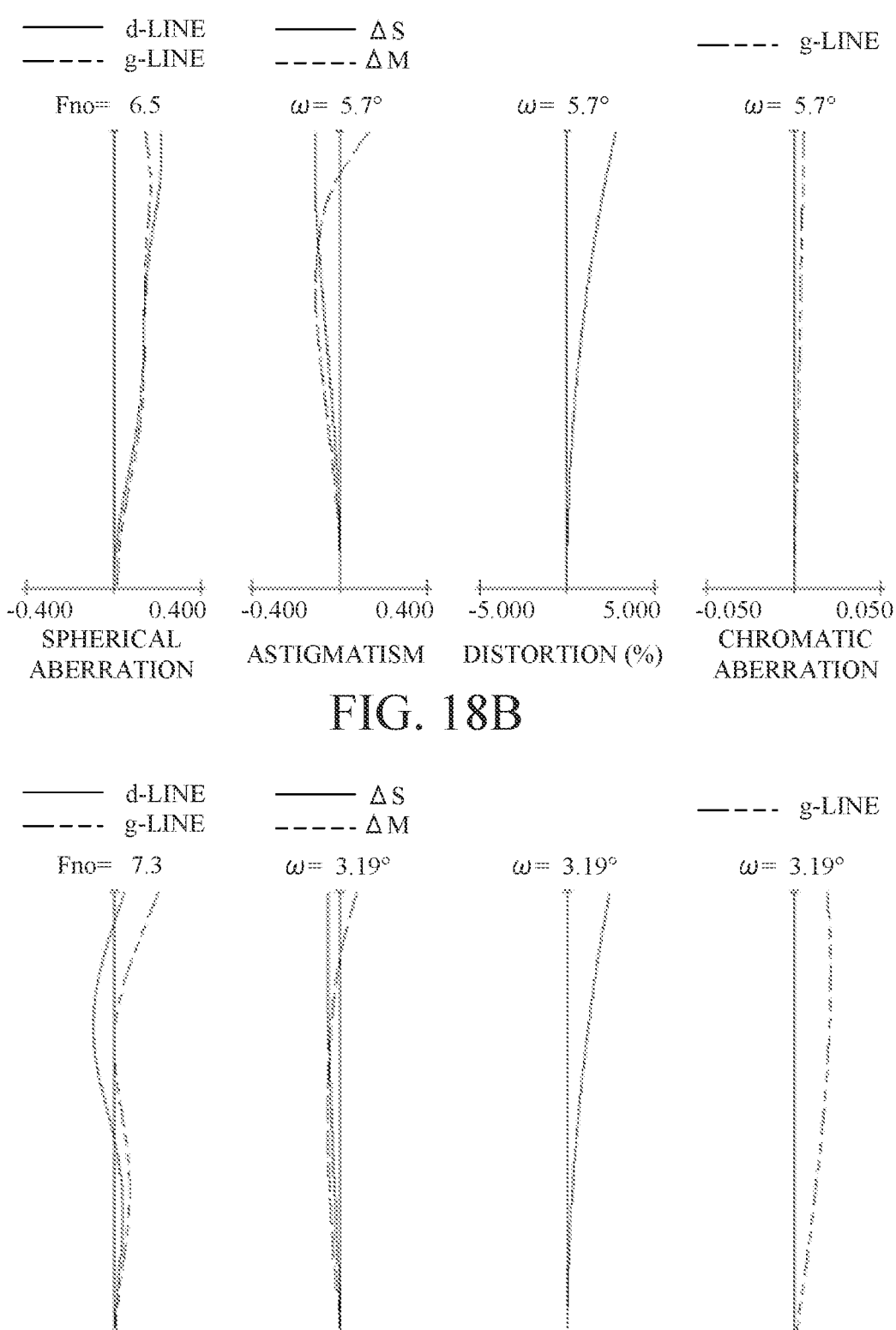
Figure 19A:
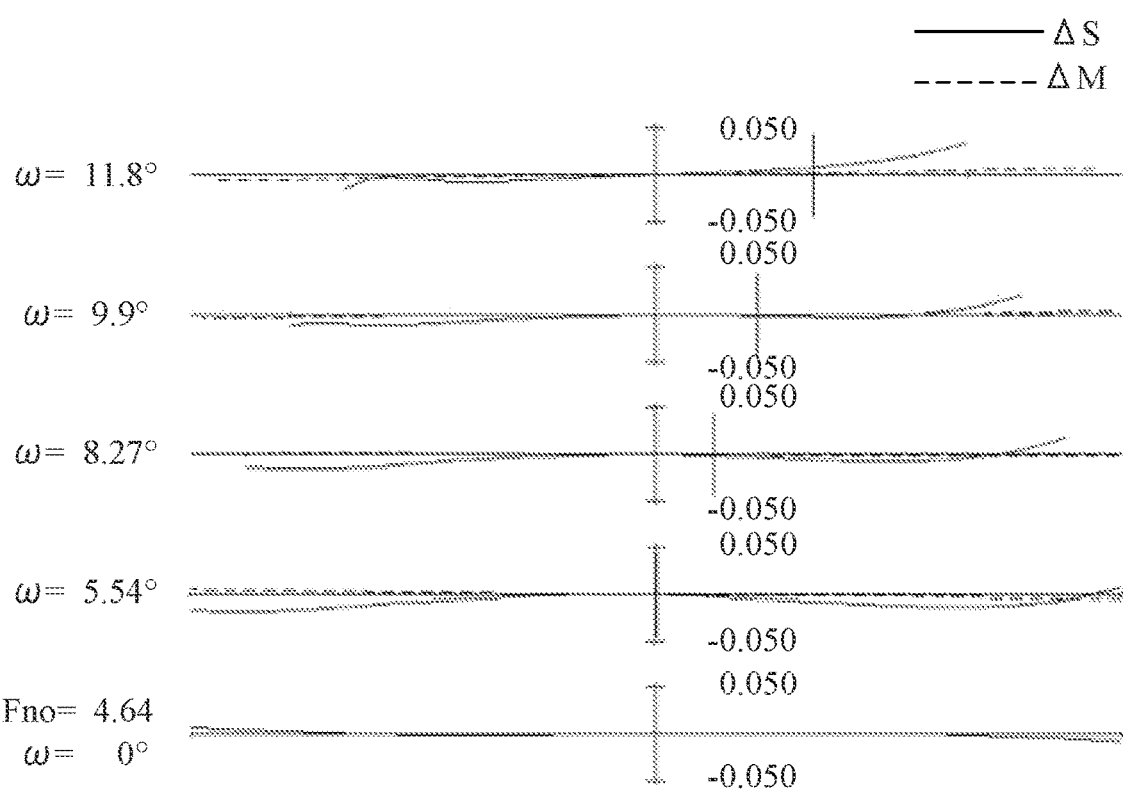
FIGS. 19A to 19C are lateral aberration diagrams of the zoom lens according to Example 5 at the wide-angle end, the intermediate zoom position, and the telephoto end, respectively.
Figure 19B:
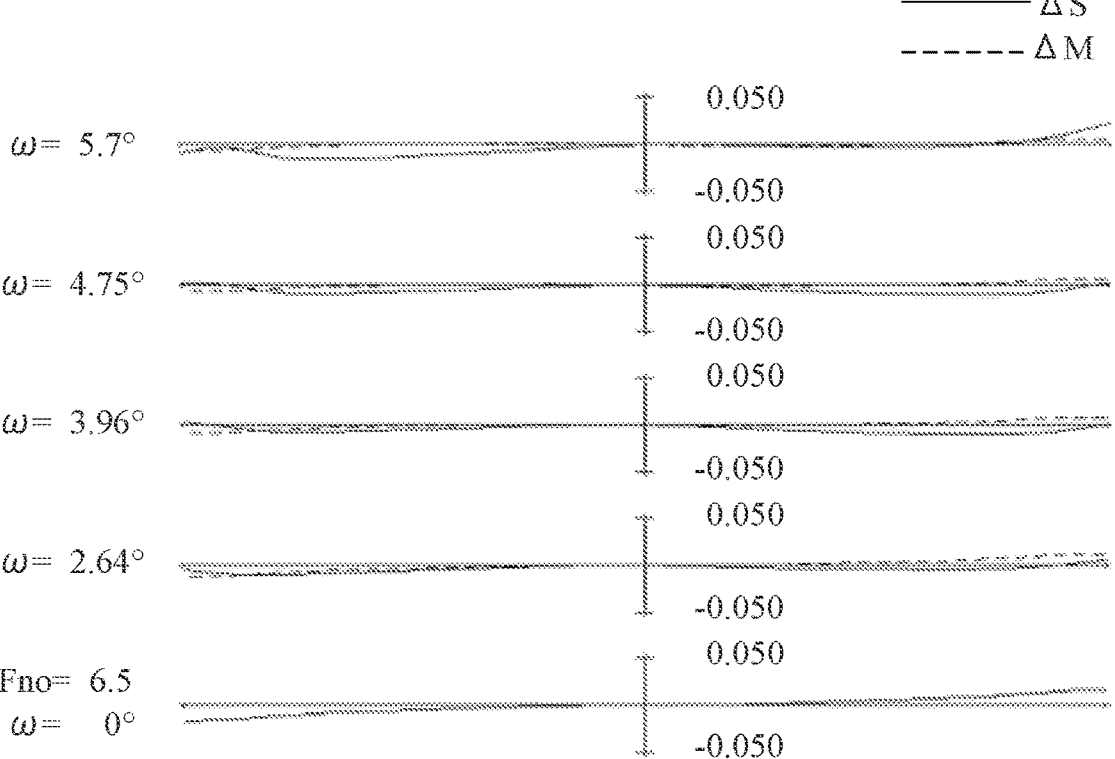
Figure 19C:
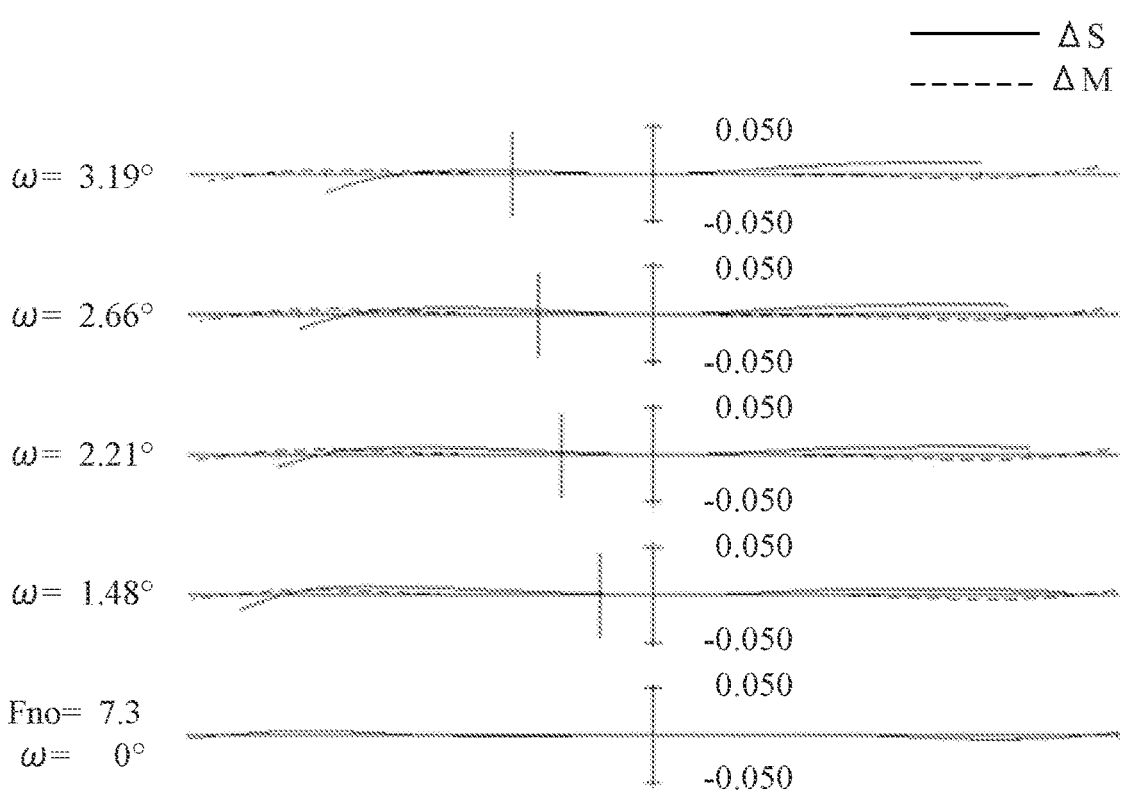
Figure 20A:
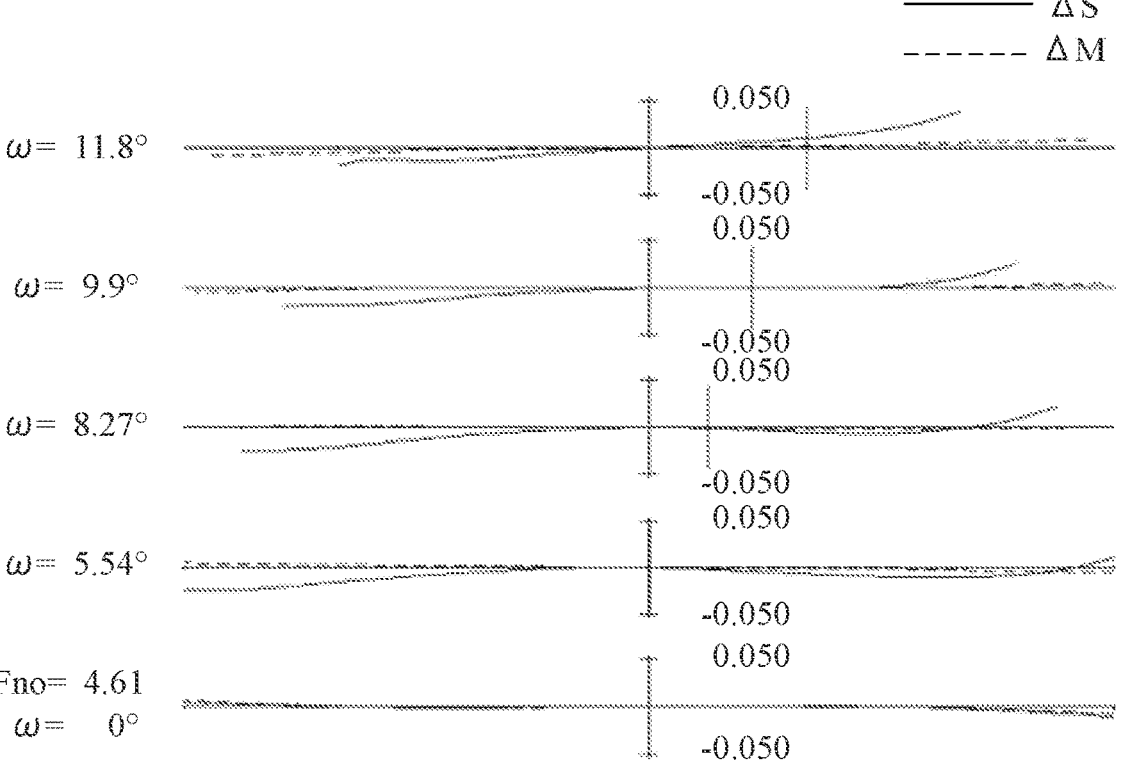
FIGS. 20A to 20C are lateral aberration diagrams of the zoom lens according to Example 5 at the wide-angle end, the intermediate zoom position, and the telephoto end, respectively, in image stabilization by 0.3 degrees.
Figure 20B:
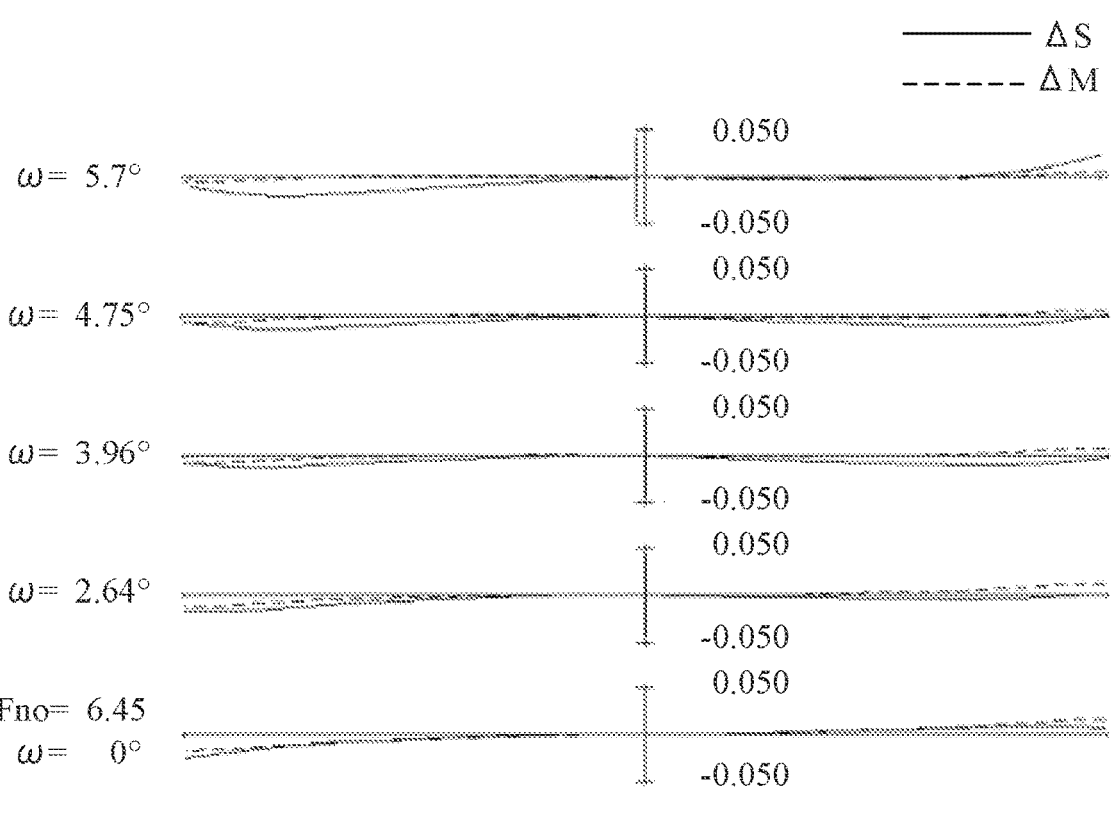
Figure 20C:
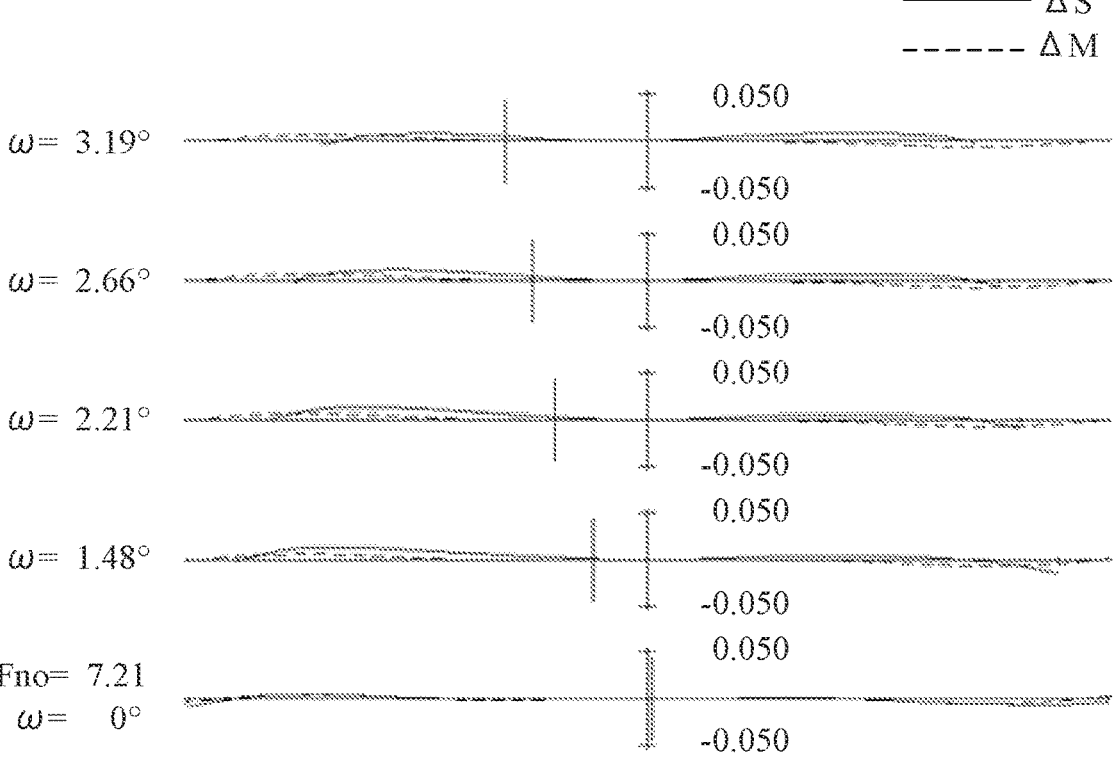

FIG. 13 illustrates a section of the fixed focal length lens according to Example 4 in an in-focus state at infinity. The fixed focal length lens $1d$ according to Example 4 (numerical example 4) has an F-number of about 1.45, and a half angle of view of 15 degrees. FIGS. 13 and 14 illustrate longitudinal and lateral aberrations of the fixed focal length lens $1d$ according to Example 4, respectively. FIG. 15 illustrates a lateral aberration of the fixed focal length lens $1d$ according to Example 4 while the image stabilizing unit is shifted to a position for correcting an angular shake by 0.3 degrees.

The zoom lenses $1a$ to $1e$ are used as an imaging optical system for an image pickup apparatus such as a digital camera, a video camera, a broadcasting camera, a surveillance camera, and a film-based camera. The zoom lenses $1a$ to $1e$ can also be used as a projection optical system of an image projection apparatus (projector).

In FIGS. 1, 5, 9, 13, and 17, a left side is an object side (front side), and a right side is an image side (rear side). Li (i=1, 2, . . . ) represents an i-th lens unit counted from the object side. IS represents the image stabilizing unit. Grep represents a resin layer. SP represents a diaphragm (aperture group). IP represents an image plane. An imaging plane of a solid-state image sensor (photoelectric conversion element) such as a CCD sensor and a CMOS sensor or a film plane of a silver film is disposed on the image plane IP. In FIGS. 1, 5, 9, and 17, the moving loci of the lens unit and the diaphragm SP that are moved during zooming from the wide-angle end to the telephoto end are indicated by arrows. An arrow, with "FOCUS" indicates a moving direction of the lens unit during focusing from an infinity object to a short-distance (or close) object.

In spherical aberration diagrams of FIGS. 2A to 2C, 6A to 6C, 10A to 10C, and 18A to 18C, Fno represents an F-number, a solid line represents a spherical aberration for the d-line (having a wavelength of 587.6 nm), and an alternate long and two short dashes line represents a spherical aberration for the g-line (having a wavelength of 435.8 nm), respectively. In astigmatism diagrams, a solid line S represents a sagittal image plane for the d-line, and a broken line M represents a meridional image plane for the d-line. Each distortion diagram illustrates the distortion for the d-line. Each chromatic aberration diagram illustrates a lateral chromatic aberration for the g-line. W represents a half angle of view (°).

A description will now be given of a lens configuration according to each example.

The zoom lens 1a according to Example 1 illustrated in FIG. 1 is a seven-unit zoom lens that consists of, in order from the object side to the image side, a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, a sixth lens unit L6 having a negative refractive power, and a seventh lens unit L7 having a positive refractive power.

During zooming from the wide-angle end to the telephoto end, the first lens unit L1 is moved to the object side, the second lens unit L2 is moved to the image side and then moved to the object side. The third lens unit L3 is moved to the object side, and the fourth lens unit L4 is moved to the object side so as to reduce a distance between the fourth lens unit L4 and the third lens unit L3. The fifth lens unit L5 is moved to the object side so that a distance between the fifth lens unit L5 and the fourth lens unit L4 reduces and then increases. The sixth lens unit L6 is moved to the object side and then to the image side so as to increase a distance between the sixth lens unit L6 and the fifth lens unit L5. The seventh lens unit L7 as the final lens unit is fixed (immobile) during zooming. The fifth lens unit L5 is moved during focusing. The diaphragm SP is disposed between the second lens unit and the third lens unit, and is fixed during zooming.

In Example 1, the image stabilizing unit IS having a negative refractive power as a whole is disposed at a position closest to the image plane in the third lens unit L3. The image stabilizing unit IS has two elements cemented together, which include a positive lens made of a resin layer Grep and a negative lens as a base lens arranged in this order from the object side to the image side.

Figures 5, 6A:
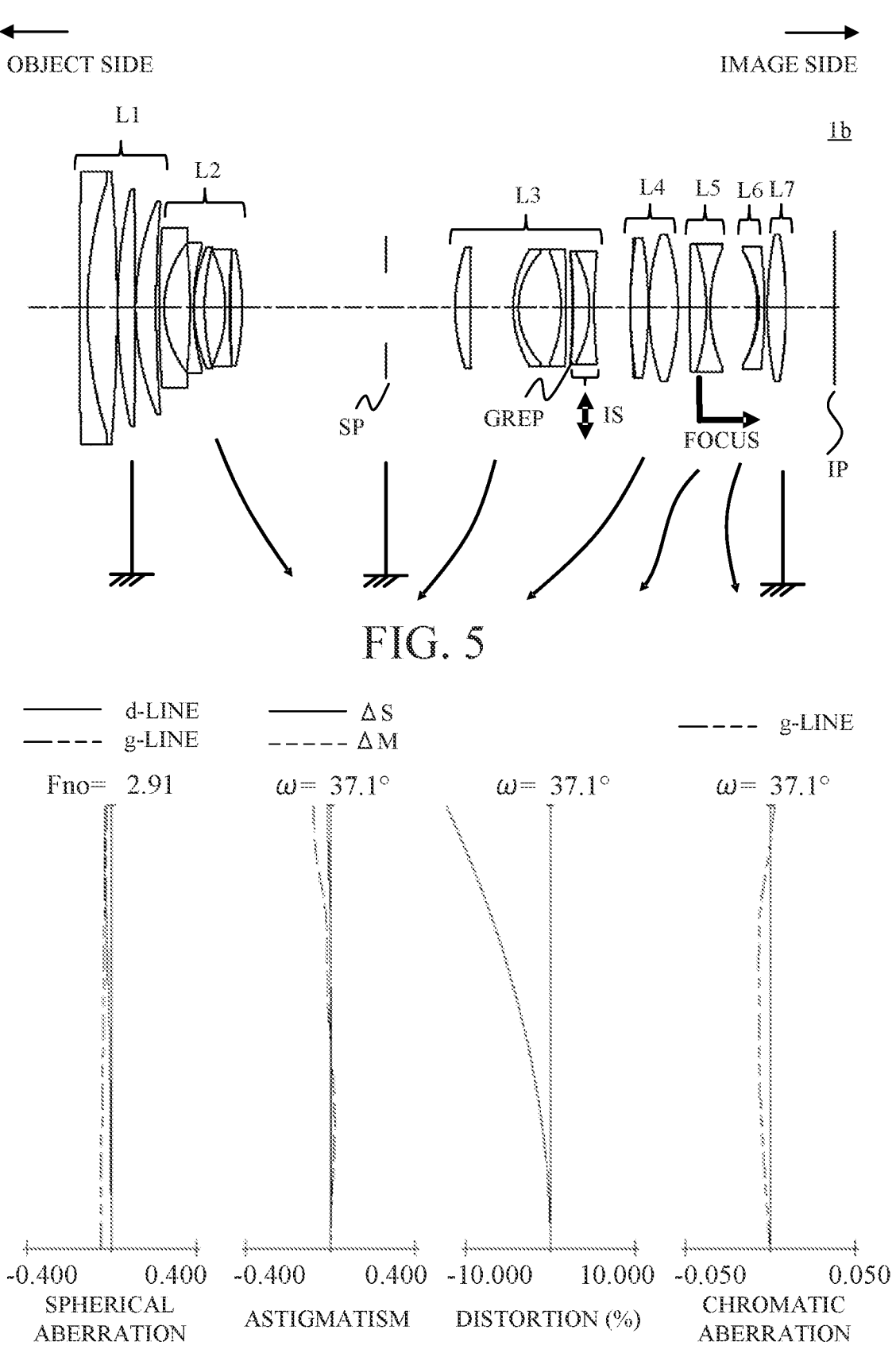
FIG. 5 is a sectional view of a zoom lens according to Example 2 at a wide-angle end.
FIGS. 6A to 6C are longitudinal aberration diagrams of the zoom lens according to Example 2 at the wide-angle end, an intermediate zoom position, and a telephoto end, respectively.
Figure 6B:
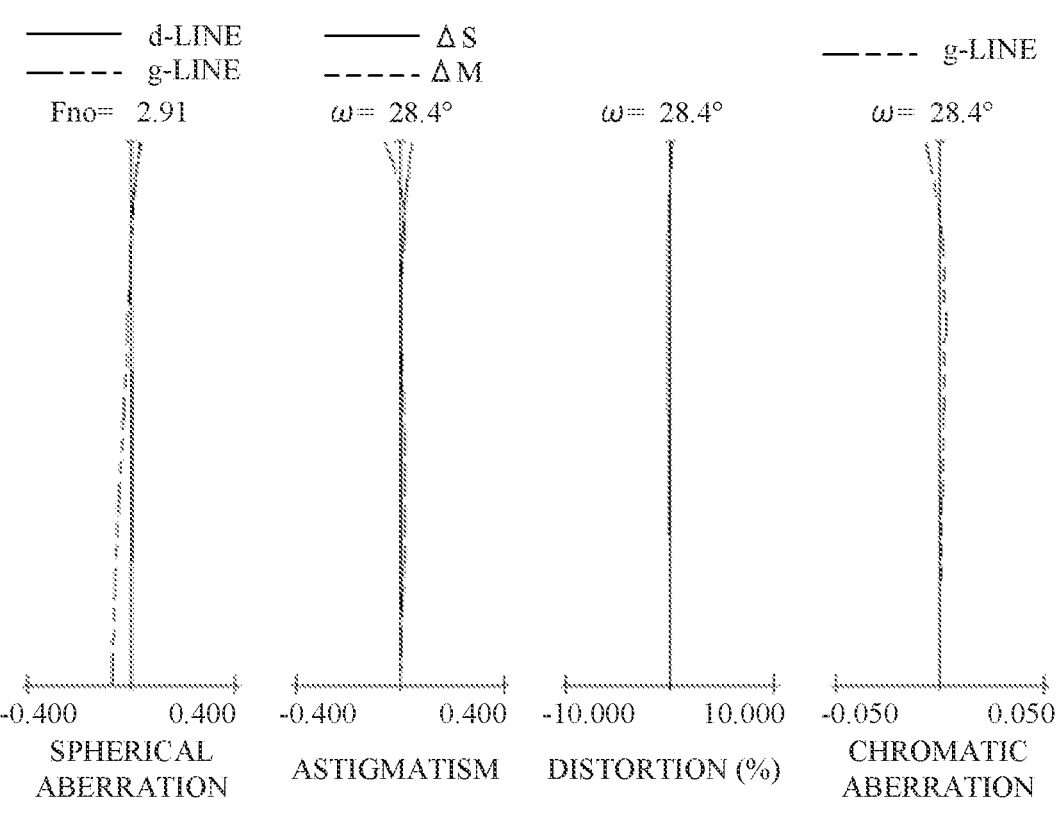
Figure 6C:
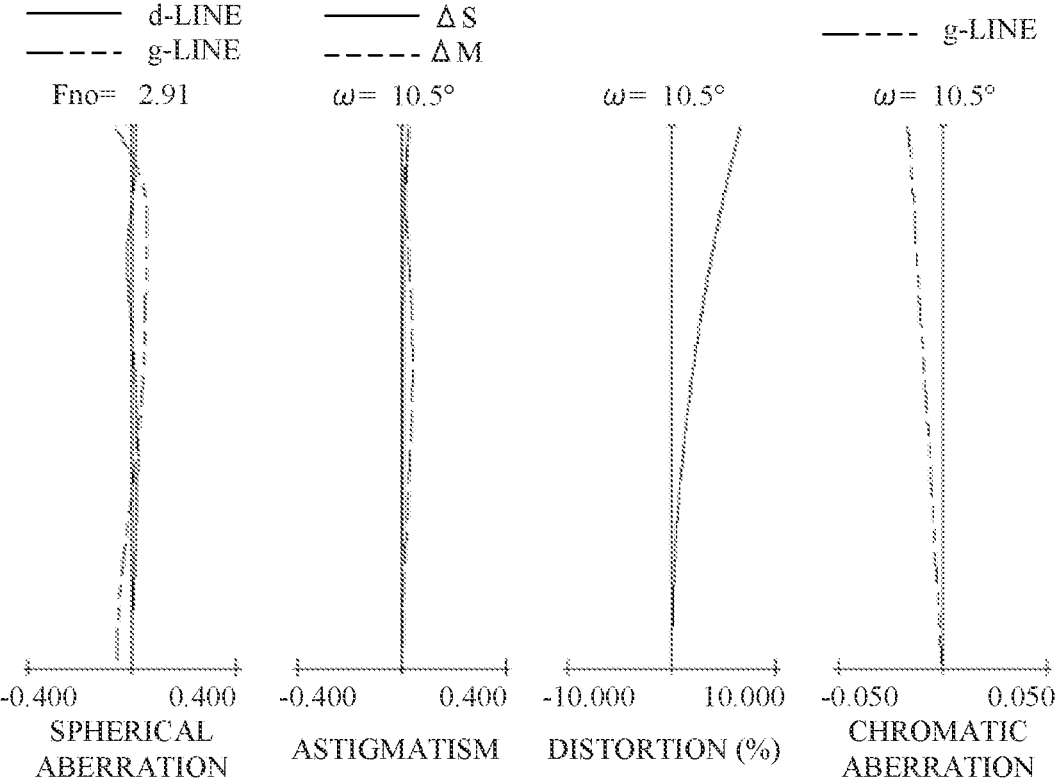
Figure 7A:
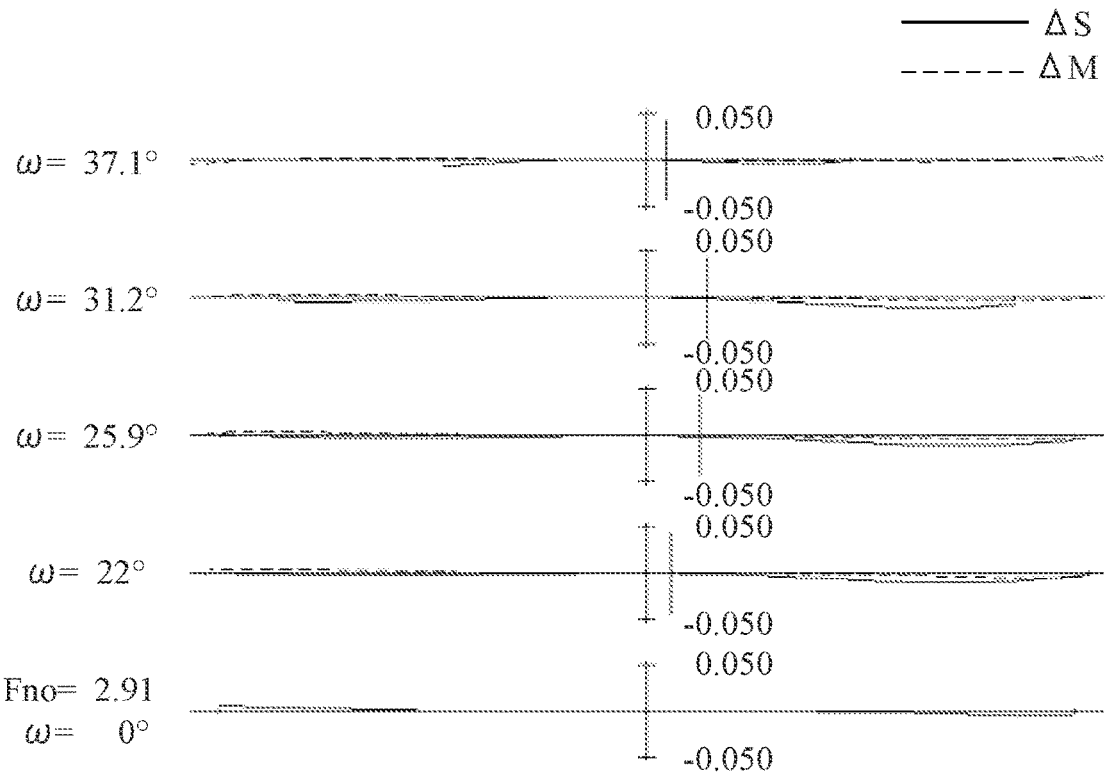
FIGS. 7A to 7C are lateral aberration diagrams of the zoom lens according to Example 2 at the wide-angle end, the intermediate zoom position, and the telephoto end, respectively.
Figure 7B:
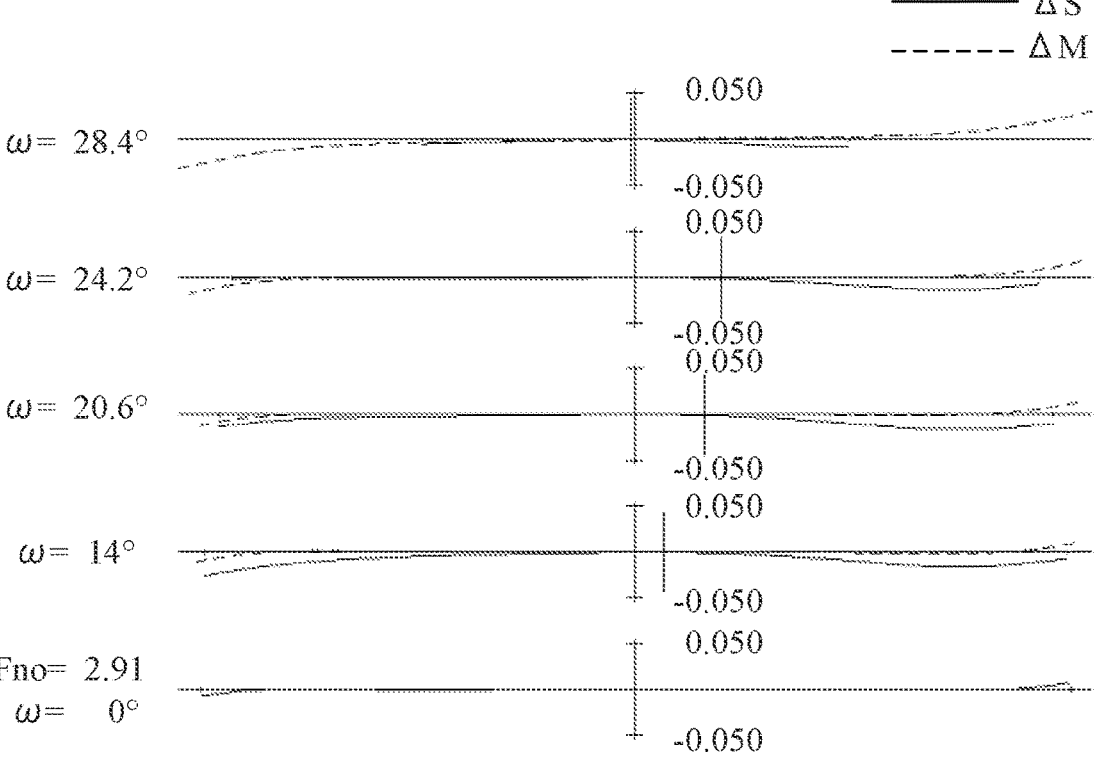
Figure 7C:
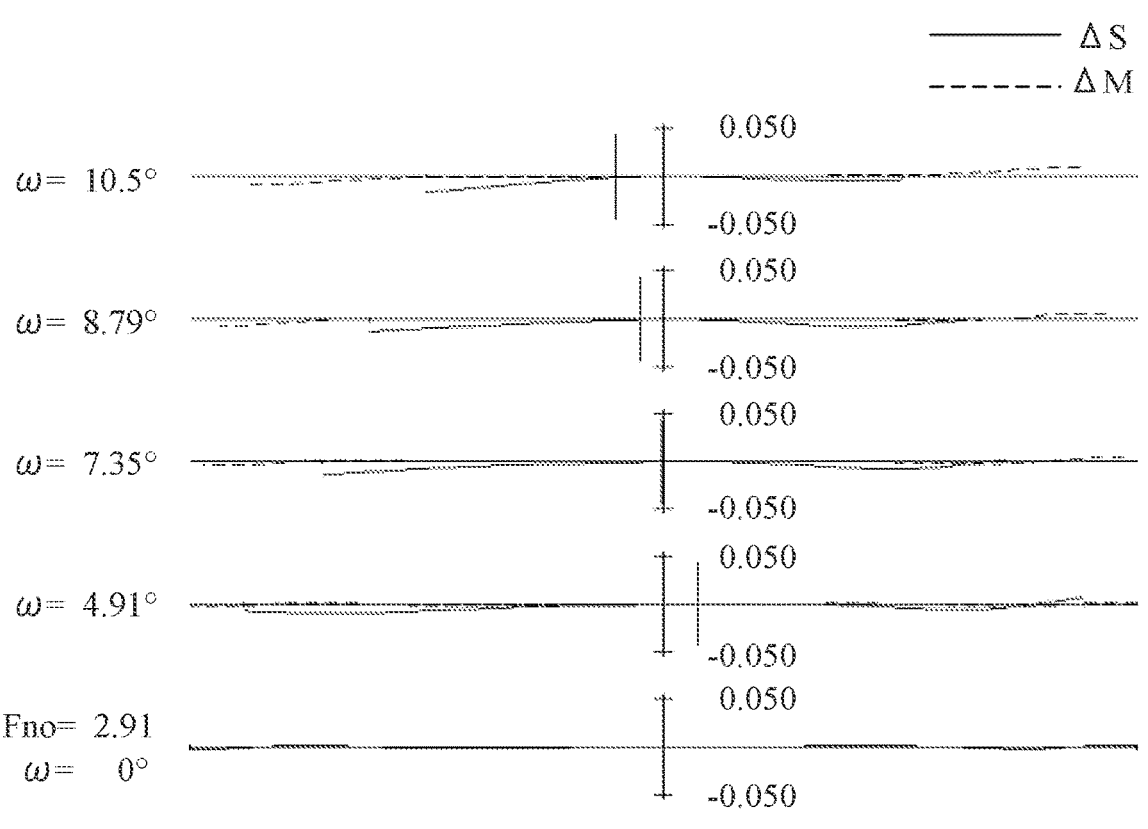
Figure 8A:
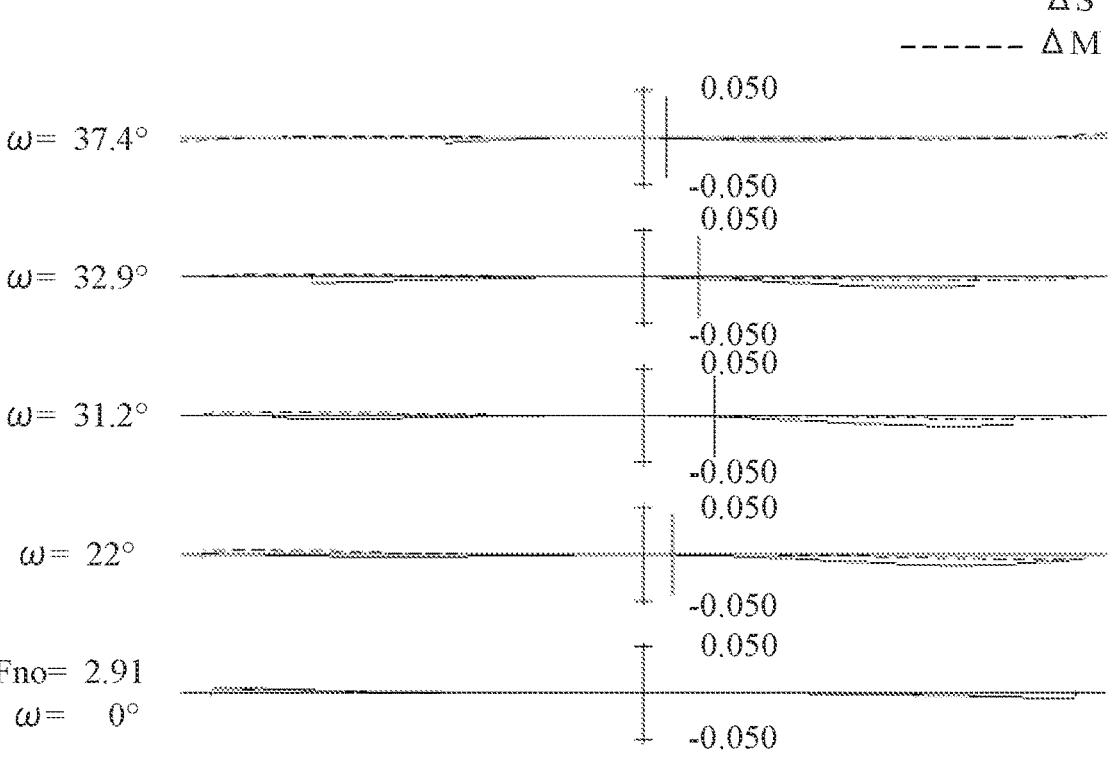
FIGS. 8A to 8C are lateral aberration diagrams of the zoom lens according to Example 2 at the wide-angle end, the intermediate zoom position, and the telephoto end, respectively, in image stabilization by 0.3 degrees.
Figure 8B:
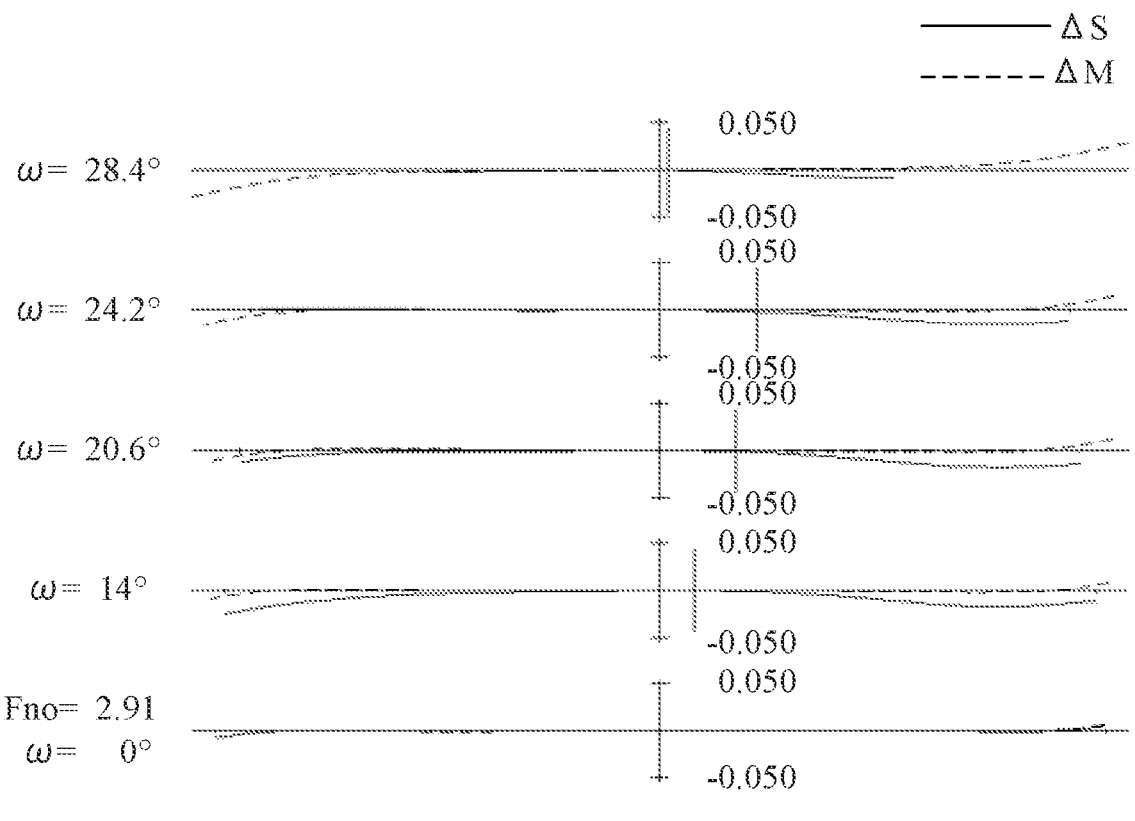
Figure 8C:
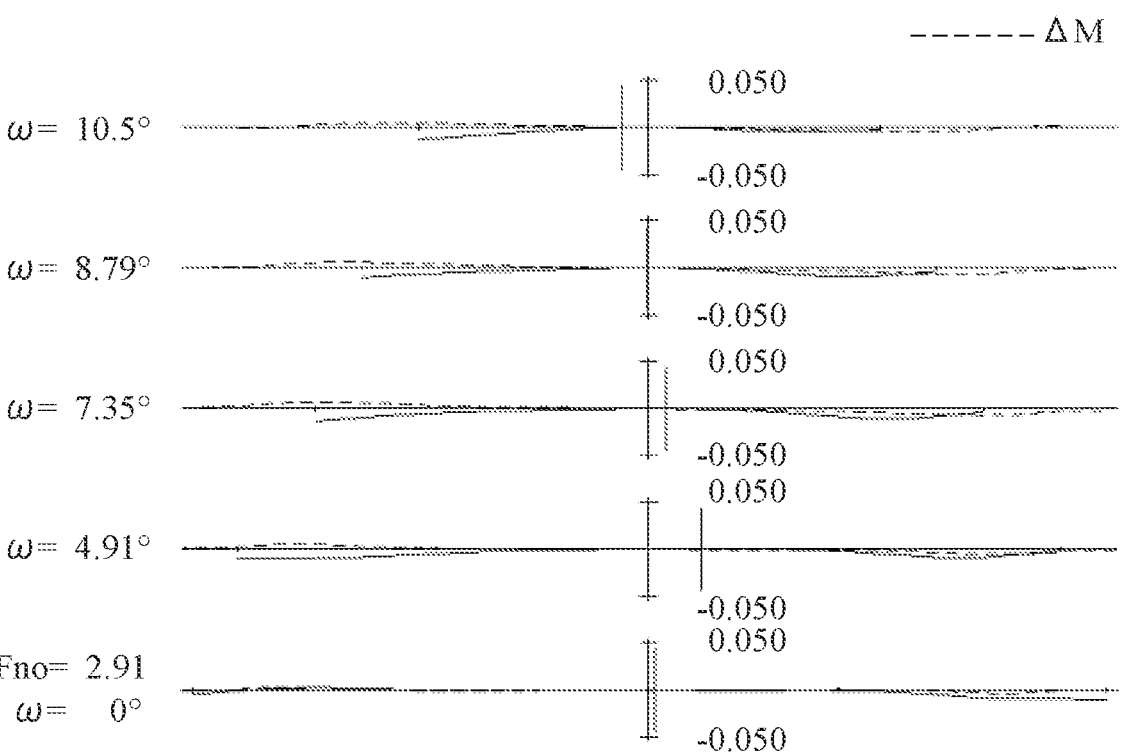

The zoom lens 1b according to Example 2 illustrated in FIG. 5 is a seven-unit zoom lens that consists of, in order from the object side to the image side, a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, a sixth lens unit L6 having a negative refractive power, and a seventh lens unit L7 having a positive refractive power.

During zooming from the wide-angle end to the telephoto end, the first lens unit L1 is fixed, and the second lens unit L2 is moved to the image side. The third lens unit L3 is moved to the object side, and the fourth lens unit L4 is moved to the object side so as to reduce a distance between the fourth lens unit L4 and the third lens unit L3. The fifth lens unit L5 is moved to the object side so that a distance between the fifth lens unit L5 and the fourth lens unit L4 once reduces and then increases. The sixth lens unit L6 is moved to the object side and then to the image side so that a distance between the sixth lens unit L6 and from the fifth lens unit L5 increases. The seventh lens unit L7 as the final lens unit is fixed during zooming. The fifth lens unit L5 is moved during focusing. The diaphragm SP is disposed between the second lens unit L2 and the third lens unit L3, and is fixed during zooming.

In Example 2, the image stabilizing unit IS having a negative refractive power as a whole is disposed at a position closest to the image plane in the third lens unit L3. The image stabilizing unit IS has three elements cemented together, which include a positive lens made of a resin layer Grep, a positive lens as a base lens, and a negative lens in this order from the object side to the image side.

Figure 9:
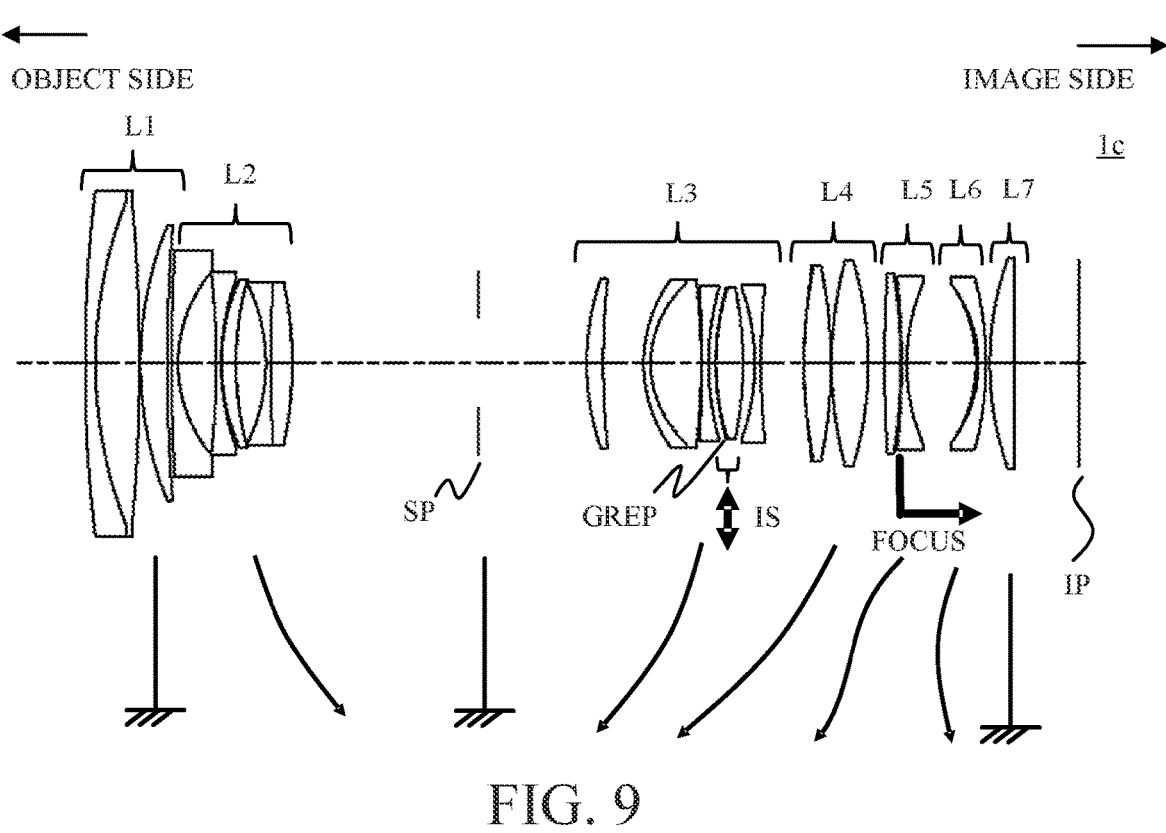
FIG. 9 is a sectional view of a zoom lens according to Example 3 at a wide-angle end.
Figure 10A:
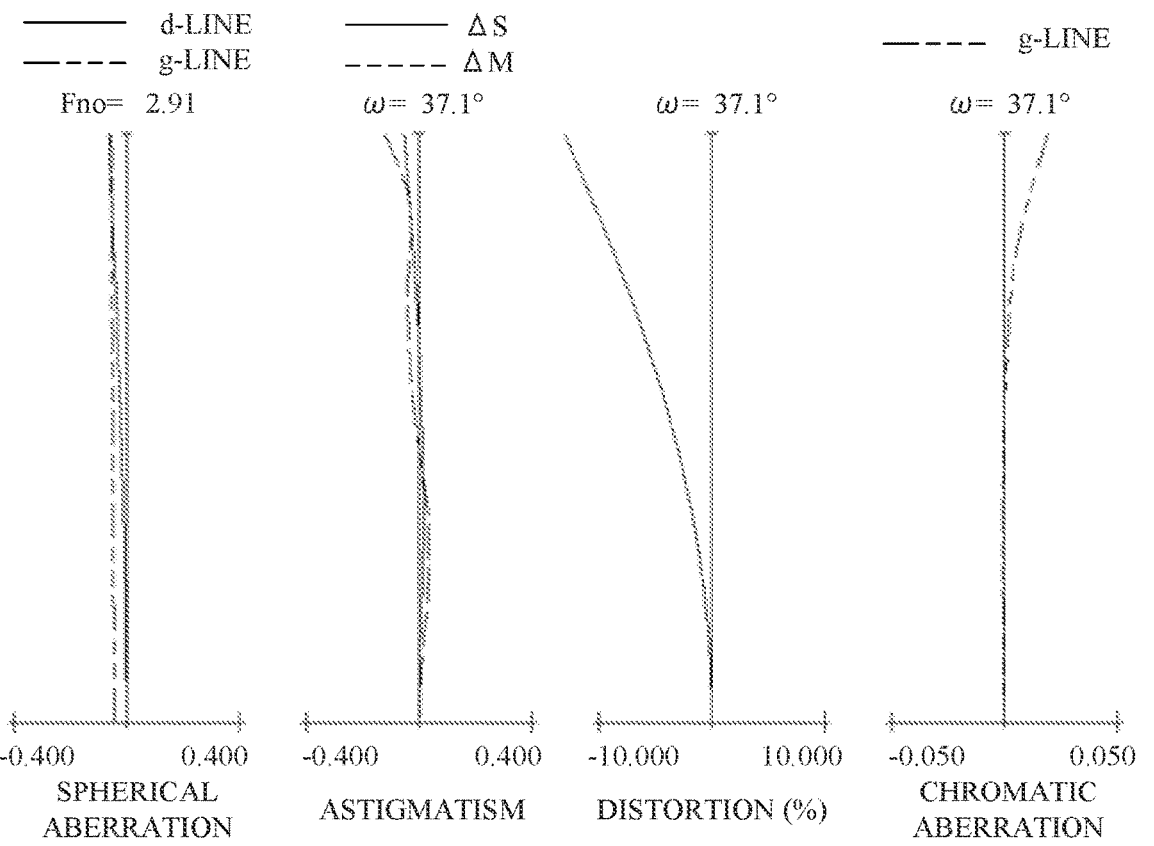
FIGS. 10A to 10C are longitudinal aberration diagrams of the zoom lens according to Example 3 at the wide-angle end, an intermediate zoom position, and a telephoto end, respectively.
Figure 10B:
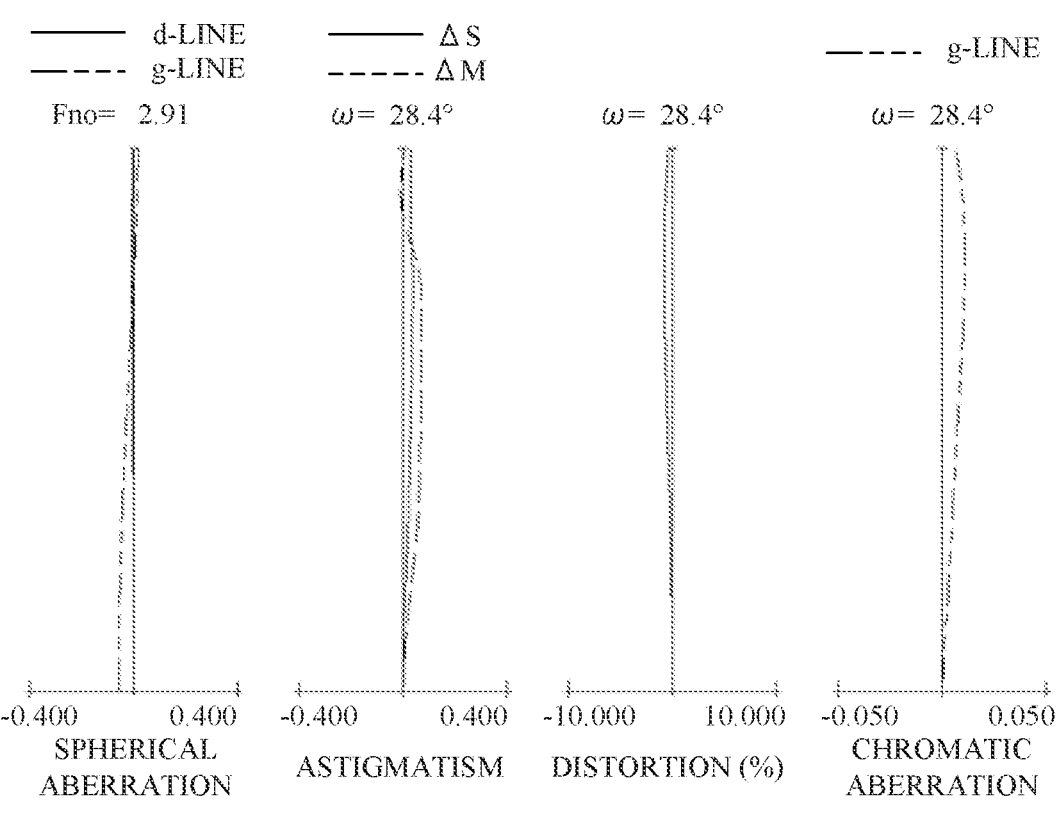
Figure 10C:
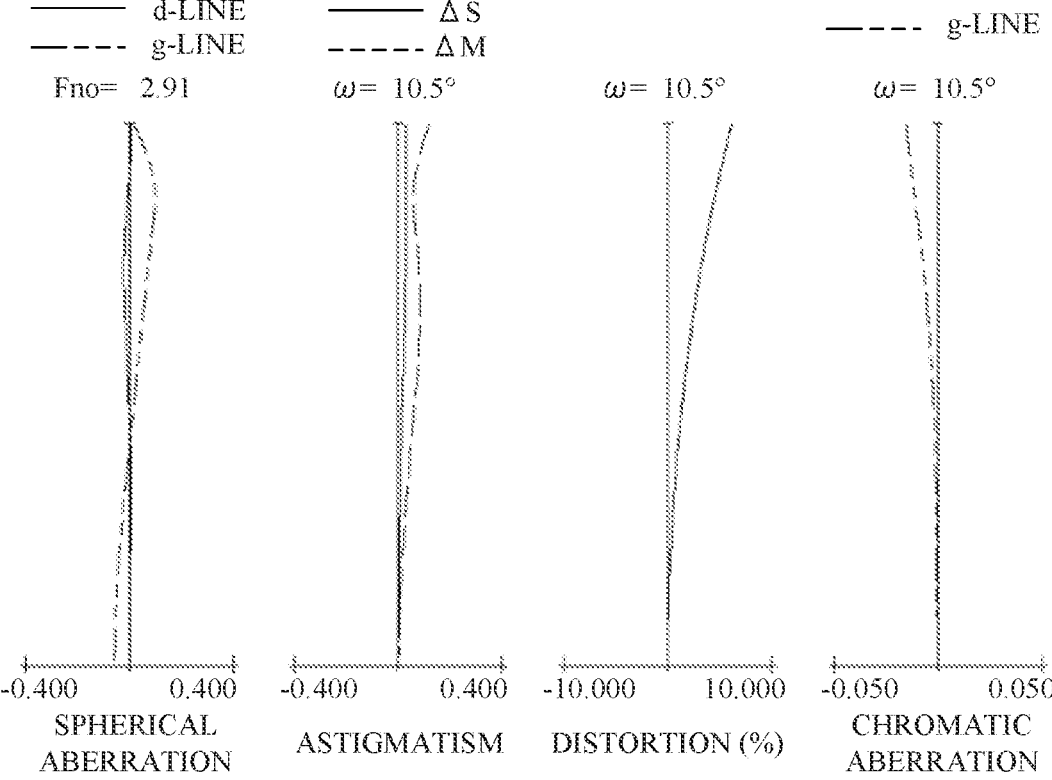
Figure 11A:
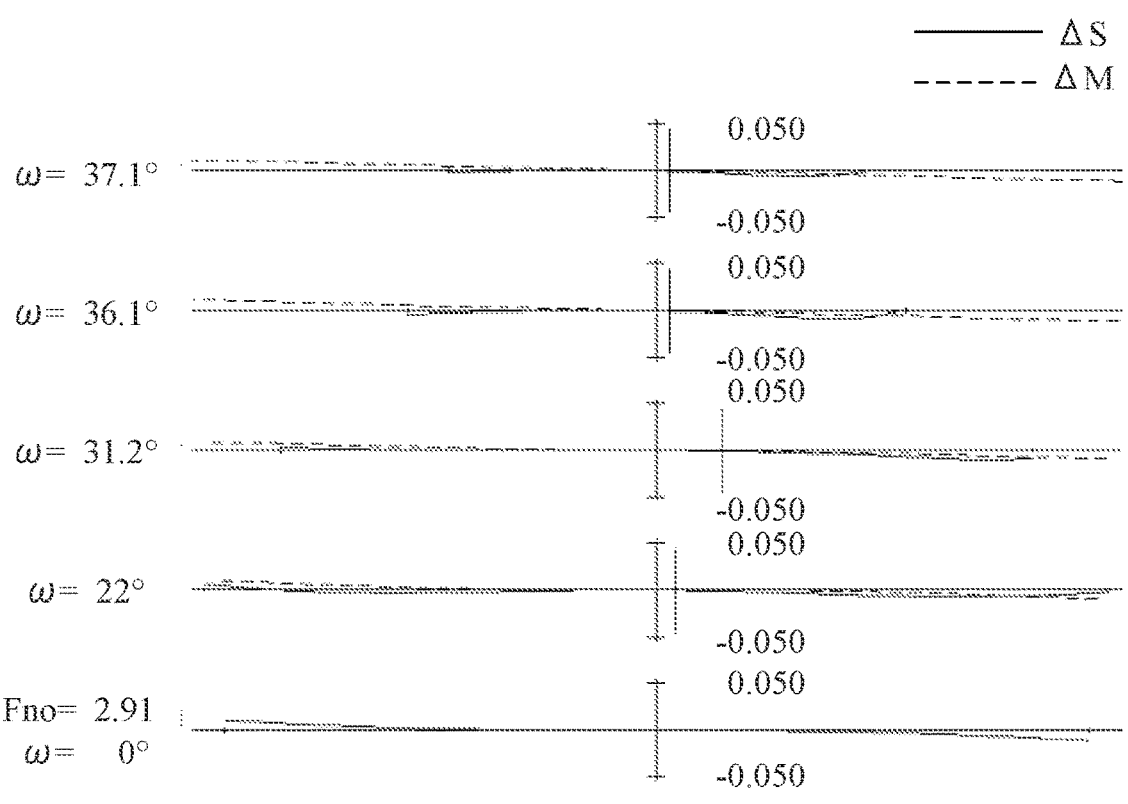
FIGS. 11A to 11C are lateral aberration diagrams of the zoom lens according to Example 3 at the wide-angle end, the intermediate zoom position, and the telephoto end, respectively.
Figure 11B:
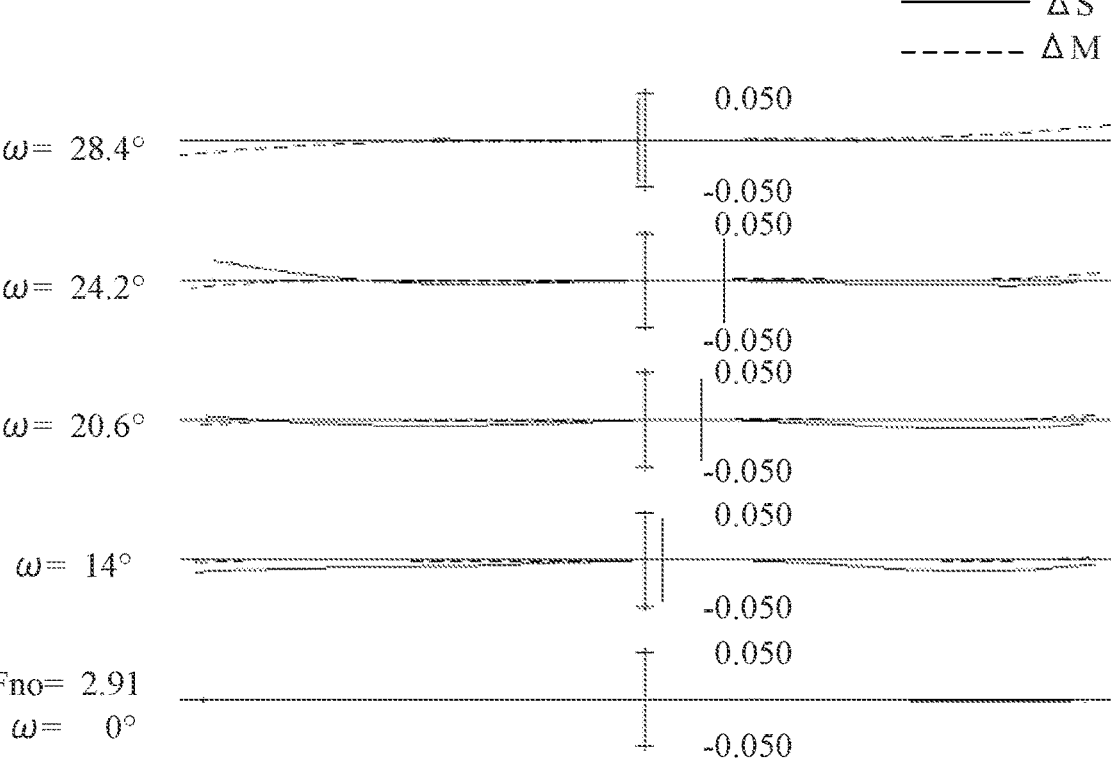
Figure 11C:
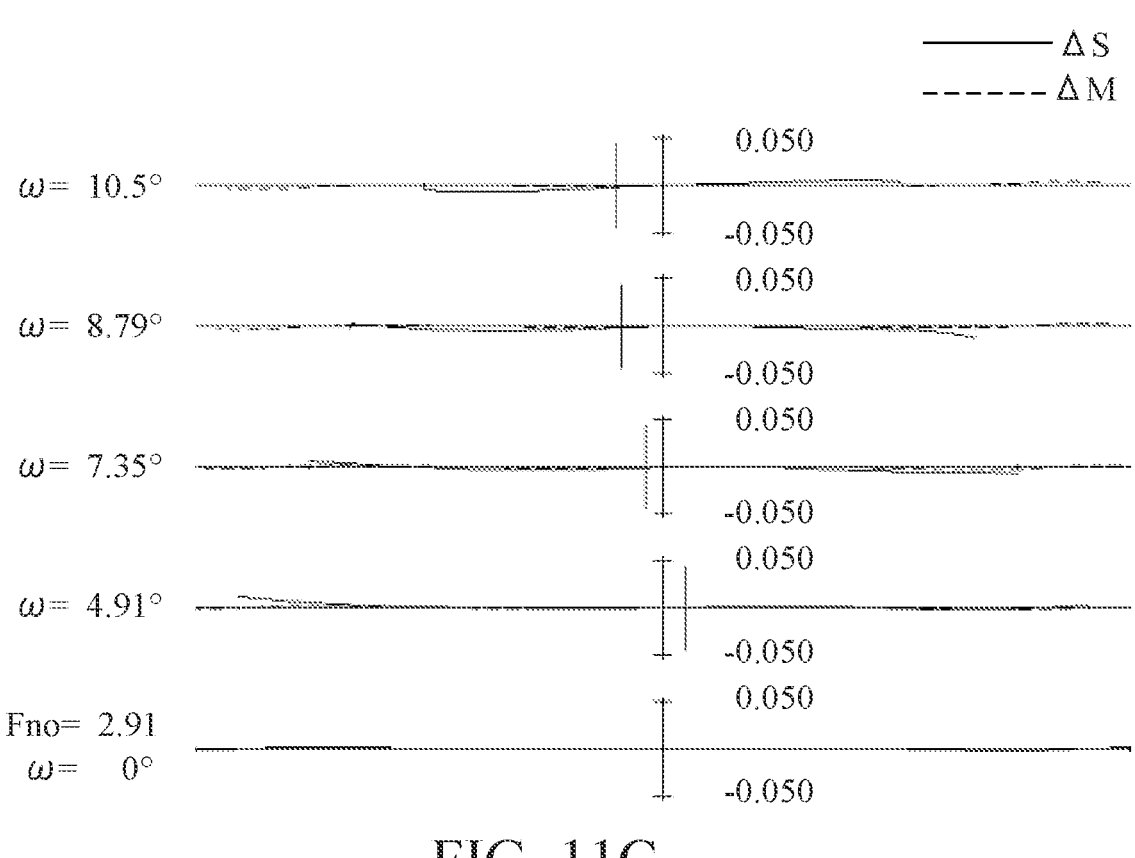
Figure 12A:
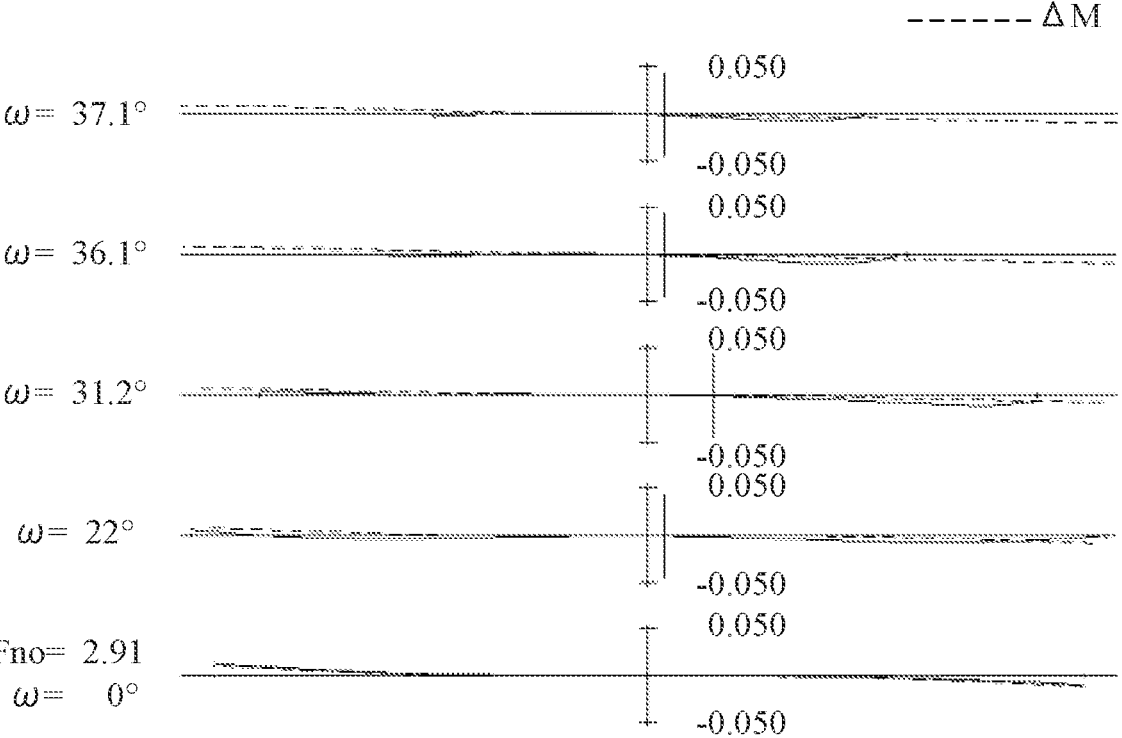
FIGS. 12A to 12C are lateral aberration diagrams of the zoom lens according to Example 3 at the wide-angle end, the intermediate zoom position, and the telephoto end, respectively, in image stabilization by 0.3 degrees.
Figure 12B:
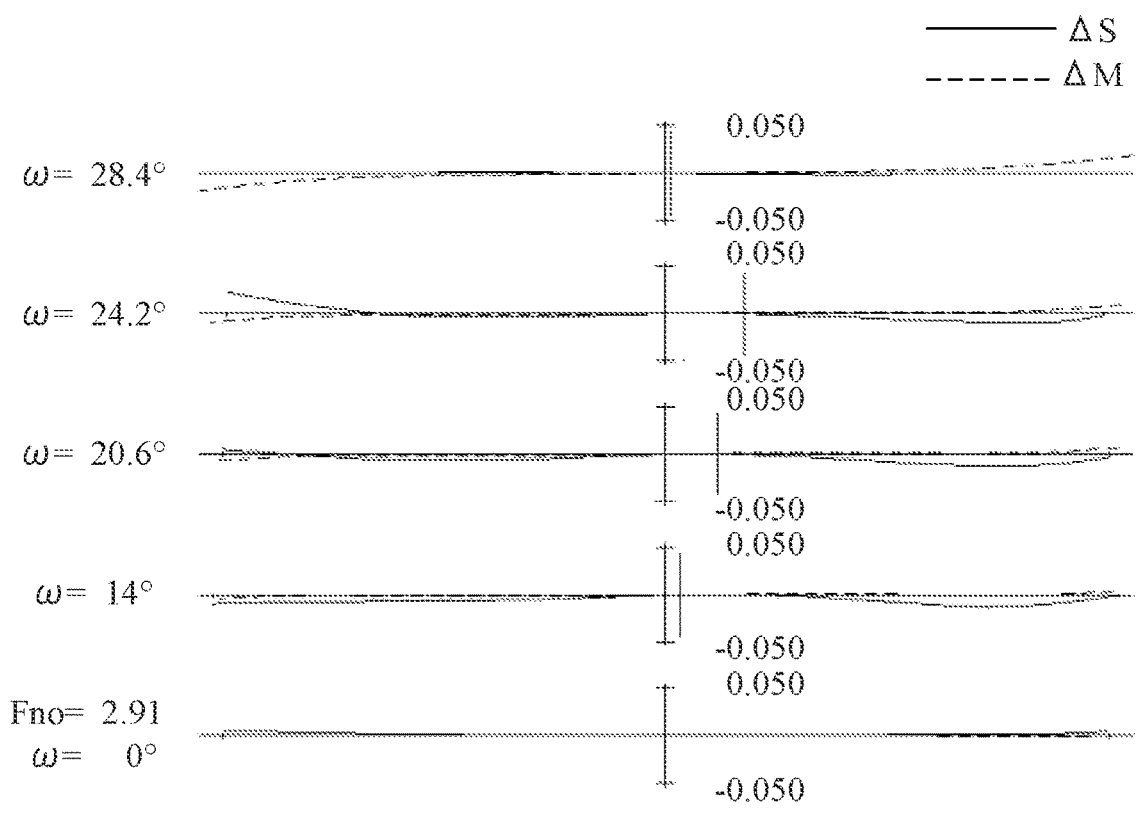
Figure 12C:
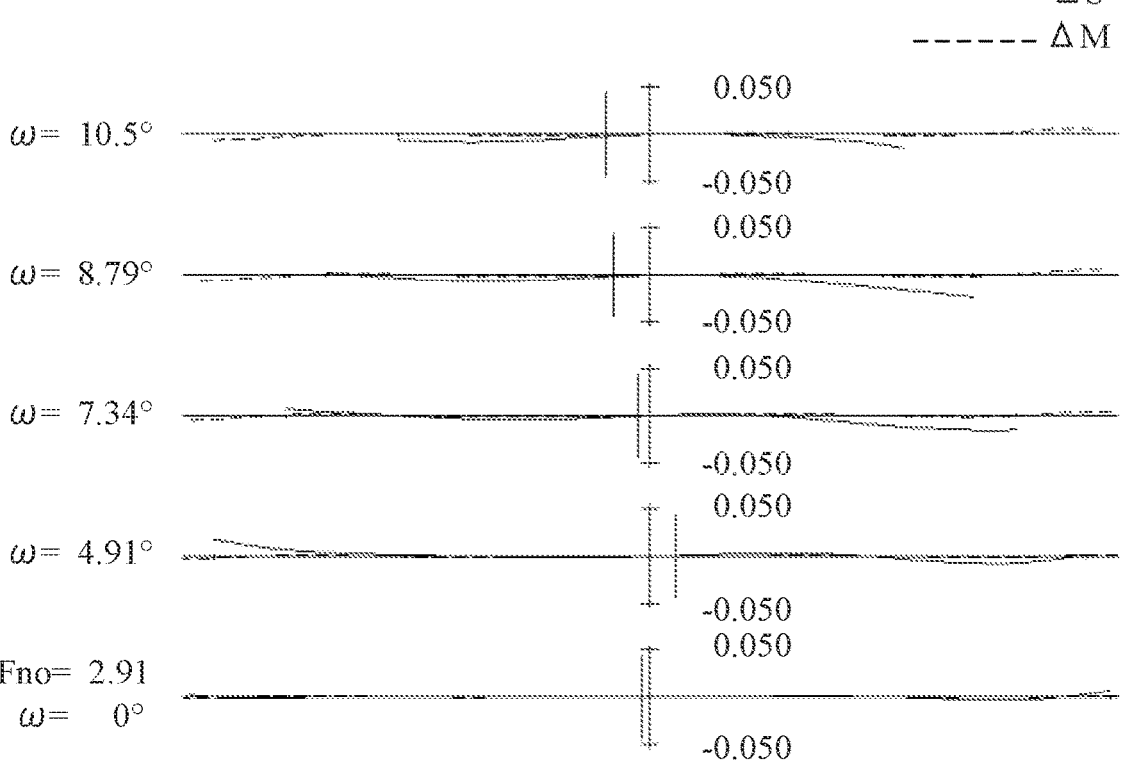

The zoom lens 1c according to Example 3 illustrated in FIG. 9 is a seven-unit zoom lens that consists of, in order from the object side to the image side, a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, a sixth lens unit L6 having a negative refractive power, and a seventh lens unit L7 having a positive refractive power.

Movements of each lens unit during zooming from the wide-angle end to the telephoto end and during focusing in Example 3 are the same as those of the zoom lens 1b according to Example 2. Even in this example, the diaphragm SP is disposed between the second lens unit L2 and the third lens unit L3, and is fixed during zooming.

In Example 3, the image stabilizing unit IS is the second from the image side in the third lens unit L3. The image stabilizing unit IS has two elements cemented together, which include a negative lens made of a resin layer Grep and a negative lens as a base lens arranged in this order from the object side to the image side.

The fixed focal length lens 1d according to Example 4 illustrated in FIG. 13 is a four-unit zoom lens that consists of, in order from the object side to the image side, a first lens unit L1 having a positive refractive power, a second lens unit L2 having a negative refractive power, a third lens unit L3 having a negative refractive power, and a fourth lens unit L4 having a positive refractive power. A diaphragm SP is disposed between the first lens unit L1 and the second lens unit L2. The second lens unit L2 is moved during focusing.

In Example 4, the entire third lens unit L3 is assigned to the image stabilizing unit IS. The third lens unit L3 includes two elements cemented together, which include a positive lens made of a resin layer Grep and a negative lens as a base lens in this order from the object side to the image side.

The zoom lens 1e according to Example 5e is a five-unit zoom lens that consists of, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a negative refractive power.

During zooming from the wide-angle end to the telephoto end, the first lens unit L1 is moved to the object side, and the second lens unit L2 is fixed. The third lens unit L3 is moved to the object side, and the fourth lens unit L4 is moved to the object side so that a distance between the fourth lens unit L4 and the third lens unit L3 reduces and then increases. The fifth lens unit L5 as the final lens unit is moved to the object side so that a distance between the fifth lens unit L5 and the fourth lens unit L4 increases and then slightly reduces. The fourth lens unit L4 is moved during focusing. The diaphragm SP is closest to the object in the second lens unit L2.

In Example 5, the image stabilizing unit IS having a negative refractive power as a whole is disposed at a position closest to the object in the second lens unit L2. The image stabilizing unit IS has three elements cemented together, which include a positive lens made of resin layer Grep, a negative lens as a base lens, a positive lens arranged in this order from the object side to the image side.

As described above, in each example, the image stabilizing unit IS includes an optical element (cemented lens) in which the resin layer Grep as a lens and the base lens are cemented together. In general, a resin material has a specific gravity lighter than that of glass, and using the resin layer in the image stabilizing unit can advantageously maintain the entire image stabilizing unit small and lightweight. In addition, forming an integral optical element by bringing the resin material into close contact with the base can simplify the structure of the image stabilizing unit, make small the entire lens system in the optical axis direction, and make lightweight an image stabilizing apparatus that includes the image stabilizing unit and a mechanism for driving the image stabilizing unit. In each example, the refractive power of the resin layer Grep in the image stabilizing unit IS is set positive or negative so as to have a sign different from that of the entire image stabilizing unit IS. This structure can suppress a longitudinal chromatic aberration and an eccentric chromatic aberration during shifting (during moving) in the image stabilizing unit IS, which would be caused by the resin layer Grep.

The zoom lenses 1a to 1e according to respective examples (numerical examples) satisfy the condition of the following expression (1):

$$-0.95 \leq fis/fr \leq 0 \tag{1}$$

where fr is a focal length of the resin layer Grep in the image stabilizing unit IS, and fis is a focal length of the image stabilizing unit IS.

The expression (1) defines a condition relating to a relationship between the focal length fr of the resin layer lens Grep and the focal length fis of the entire image stabilizing unit IS so as to satisfactorily correct an eccentric chromatic aberration and eccentric coma generated when the image stabilizing unit IS is shifted from the optical axis to correct an image blur. The expression (1) is set in a negative range. This means that the focal length fr of the resin layer Grep always has a different sign from that of the image stabilizing unit IS. This configuration can correct the chromatic aberration of the image stabilizing unit IS and correct the eccentric chromatic aberration and eccentric coma during shifting. If the focal length fis of the image stabilizing unit IS becomes smaller so that fis/fr becomes higher than the upper limit of the expression (1), the refractive power of the image stabilizing unit IS becomes too strong and it becomes difficult to sufficiently correct the eccentric coma and eccentric curvature of field. If the focal length fr of the resin layer Grep becomes larger so that fis/fr is higher than 0, which is the upper limit of the expression (1), it becomes difficult to correct the chromatic aberration of the image stabilizing unit IS and to suppress the eccentric chromatic aberration and eccentric coma during shifting.

On the other hand, if the focal length fis of the image stabilizing unit IS becomes larger so that fis/fr becomes lower than the lower limit of the expression (1), it becomes necessary to increase a shift amount of the image stabilizing unit IS to correct an image blur. Therefore, the image stabilizing unit becomes larger. Moreover, if the shift amount of the image stabilizing unit IS becomes too large, high-order eccentric coma and the like also increase. If the focal length fr of the resin layer Grep becomes smaller so that fis/fr becomes lower than the lower limit of the expression (1), the refractive power of the resin layer Grep becomes too strong and the chromatic aberration and eccentric chromatic aberration of the image stabilizing unit IS are likely excessive. Moreover, a large volume of the resin layer for securing the refractive power of the resin layer Grep hinders the weight reduction.

The numerical range of the expression (1) may be set as follows:

$$-0.50 \leq fis/fr \leq -0.01 \tag{1a}$$

The numerical range of the expression (1) may be set as follows:

$$-0.30 \leq fis/fr \leq -0.05 \tag{1b}$$

Assume that vd_r is an Abbe number of the resin layer based on the d-line Grep, nd_r is a refractive index of the resin layer Grep for the d-line, dr is a thickness on the optical axis of the resin layer Grep, and Dis is a thickness on the optical axis of the entire image stabilizing unit IS. βist is a lateral magnification of the image stabilizing unit IS while the focal length of the entire lens (1a to 1e) is maximum, and βrt is a combined lateral magnification of all lens units on the image side of the image stabilizing unit IS while the focal length of the entire lens is maximum. R1 is a radius of curvature of a lens surface closest to the object in the image stabilizing unit IS, and R2 is a radius of curvature of a lens surface closest to the image plane in the image stabilizing unit IS. Dmax is a maximum thickness in the optical axis direction within an effective diameter of the resin layer Grep, and Dmin is a minimum thickness in the optical axis direction within the effective diameter of the resin layer Grep. Dstpw is a distance on the optical axis from the diaphragm SP to the lens surface closest to the object in the image stabilizing unit IS while the focal length of the entire lens system is minimum. OTDw is a distance (overall lens length) on the optical axis from the lens surface closest to the object of the entire lens system to the image plane in the same state while the focal length of the entire lens system is minimum. ft is a focal length of the entire lens system at the telephoto end of each zoom lens (1a to 1c, 1e), vd_gave is an average Abbe number based on the d-line of all lenses other than the resin layer in the image stabilizing unit IS, and vd_r is an Abbe number based on the d-line of the resin layer Grep. Then, the lens according to each example may satisfy at least one of the conditions set in the following expressions (2) to (10):

$$15 \leq vd\_r \leq 40 \tag{2}$$

$$1.50 \leq nd\_r \leq 1.75 \tag{3}$$

$$0.001 \leq dr/Dis \leq 0.850 \tag{4}$$

$$0.1 \leq |(1-\beta ist)\beta rt| \leq 5.0 \tag{5}$$

$$|(R2+R1)/(R2-R1)| \leq 2.0 \tag{6}$$

$$1.1 \leq D\,max/D\,min \leq 30.0 \tag{7}$$

$$|Dstpw/OTDw| \leq 0.8 \tag{8}$$

$$0.05 \leq |fis/ft| \leq 2.00 \tag{9}$$

$$5.0 \leq |vd\_gave - vd\_r| \leq 60.0 \tag{10}$$

The expression (2) defines a condition regarding the Abbe number vd_r of the resin layer Grep so as to satisfactorily correct the chromatic aberration during shifting of the image stabilizing unit IS. If vd_r is higher than the upper limit of the expression (2), the chromatic aberration in the image stabilizing unit IS is likely overcorrected. In addition, vd_r becomes close to the Abbe number of the base lens, and the refractive powers of the base lens and the resin layer Grep are likely strong, and the image stabilizing unit IS becomes consequently larger On the other hand, vd_r lower than the lower limit of the expression (2) is advantageous for the first-order chromatic aberration correction of the image stabilizing unit IS, but it becomes difficult to correct the second-order chromatic aberration because a partial dispersion ratio ΘgF for the g-line becomes large. Further, it is difficult for the resin material to have an Abbe number lower than the lower limit of the expression (2).

The expression (3) defines a condition regarding the refractive index nd_r of the resin layer Grep in order to achieve both suppression of the eccentric coma during shifting of the image stabilizing unit IS and a weight reduction of the image stabilizing unit IS. nd_r higher than the upper limit of the expression (3) is advantageous for the weight reduction of the image stabilizing unit IS. However, since the refractive index nd_r of the resin layer Grep is too high, when the surface accuracy of the resin layer deviates from a designed value due to manufacturing errors or the like, the optical performance such as coma excessively deteriorates. Moreover, it is difficult for the resin material to obtain a refractive index higher than the upper limit of the expression (3).

On the other hand, if nd_r is lower than the lower limit of the expression (3), a large volume of the resin layer Grep hinders the size and weight reductions. As the refractive index of the resin material becomes smaller, the Abbe number vd_r is likely to increase, and the degree of freedom in selecting a glass material for the base lens is limited from the viewpoint of the chromatic aberration correction in the image stabilizing unit IS. Further, it is difficult for the resin material to obtain a refractive index lower than the lower limit of the expression (3).

The expression (4) defines a condition regarding the thickness dr of the resin layer Grep and the overall thickness Dis of the image stabilizing unit IS in order to achieve both the weight reduction of the image stabilizing unit IS and the suppressions of various aberrations during shifting. If the thickness of the resin layer Grep becomes larger so that dr/Dis is higher than the upper limit of the expression (4), it becomes difficult to reduce the size and weight of the image stabilizing unit IS. If the thickness of the image stabilizing unit IS becomes smaller so that dr/Dis becomes higher than the upper limit of the expression (4), the resin layer Grep becomes relatively thicker and the performance of molding a highly accurate resin surface is likely to deteriorate in manufacturing the resin layer Grep.

On the other hand, a small thickness of the resin layer Grep such that dr/Dis is lower than the lower limit of the expression (4) becomes advantageous from the size and weight reductions of the image stabilizing unit IS. However, in the case where the resin layer Grep becomes a positive lens, it becomes difficult to sufficiently increase the refractive power. As a result, the chromatic aberration during shifting cannot be sufficiently corrected. Moreover, in the case where the resin layer Grep is a negative lens and the eccentric aberration is to be sufficiently corrected, a thickness deviation ratio, which is a ratio between the thickness on the optical axis and the thickness near the effective diameter, needs to be larger and hinders the molding performance. If the resin layer Grep becomes thicker so that dr/Dis is higher than the upper limit of the expression (4), the overall volume of the image stabilizing unit IS increases and hinders the size and weight reductions. If the image stabilizing unit IS becomes thinner so that dr/Dis is higher than the upper limit of the expression (4), the resin layer Grep becomes relatively thicker and the performance of molding a highly accurate resin surface is likely to deteriorate in manufacturing the resin layer Grep.

The expression (5) defines a condition regarding a relationship between a lateral magnification βist of the image stabilizing unit IS and a combined lateral magnification βrt of all lens units on the image side of the image stabilizing unit IS in order to secure the image stabilizing performance of the image stabilizing unit IS and to reduce the size and weight of the image stabilizing unit IS, where the lateral magnification βist and the combined lateral magnification Ort are values at the telephoto end of the zoom lens. |(1−βist) βrt| in the expression (5) indicates a ratio of a shift amount of an image on the image plane to a shift amount of the image stabilizing unit IS, that is, so-called eccentric sensitivity.

The lateral magnification of the image stabilizing unit IS that becomes larger so that |(1−βist) βrt| is higher than the upper limit of the expression (5) is advantageous from the suppressed shift amount of the image stabilizing unit IS and the small size of image stabilizing unit. However, the eccentric sensitivity becomes too high and causes eccentric coma or the like, if the image stabilizing unit IS shifts from the optical axis due to manufacturing errors or the like where no image blur occurs. Further, it becomes difficult to mechanically control the shift amount of the image stabilizing unit IS.

On the other hand, if the lateral magnification of the image stabilizing unit IS becomes smaller so that |(1−βist) βrt| is lower than the lower limit of the expression (5), it becomes necessary to increase the shift amount of the image stabilizing unit IS in order to obtain a sufficient correction amount (correction angle) for the image stabilization and consequently the image stabilizing unit becomes larger.

The expression (6) defines a condition relating to a ratio using a radius of curvature R1 of the lens surface closest to the object of the image stabilizing unit IS and a radius of curvature R2 of the lens surface closest to the image plane of the image stabilizing unit IS, that is, a so-called shape factor, so as to correct an eccentric aberration during shifting of the image stabilizing unit IS. If |(R2+R1)/(R2−R1)| is higher than the upper limit of the expression (6), the entire image stabilizing unit IS has a meniscus shape and it becomes difficult to suppress eccentric coma during shifting.

The expression (7) defines a condition relating to the so-called thickness deviation ratio or a ratio of a maximum thickness Dmax and a minimum thickness Dmin in the optical axis direction of the resin layer Grep in order to achieve both the weight reduction of the image stabilizing unit IS and the suppressions of various aberrations during shifting. Both the maximum thickness Dmax and the minimum thickness Dmin are obtained from a range within the lens effective diameter of the resin layer Grep. Dmax/Dmin higher than the upper limit of the expression (7) is advantageous for the eccentric aberration correction of the image stabilizing unit IS, but the molding performance deteriorates and thus the manufacturing performance lowers. If the thickness deviation ratio becomes larger, a large volume of the resin layer Grep hinders the weight reduction. On the other hand, if Dmax/Dmin is lower than the lower limit of the expression (7), it becomes difficult to sufficiently correct the eccentric aberration during shifting of the image stabilizing unit IS.

The expression (8) defines a condition relating to a relationship between the distance Dstpw from the diaphragm SP to the lens surface closest to the object of the image stabilizing unit IS and the overall lens length OTDw so as to suppress various aberrations during shifting of the image stabilizing unit IS. Here, the distance Dstpw and the overall lens length OTDw are values at the wide-angle end of the zoom lens. If |Dstpw/OTDw| is higher than the upper limit of the expression (8), the distance Dstpw between the diaphragm SP and the image stabilizing unit IS becomes larger and it becomes difficult to suppress a curvature of field during shifting of the image stabilizing unit IS.

The expression (9) defines a condition relating to a relationship between the focal length ft of the entire lens system and the focal length fis of the image stabilizing unit IS in order to suppress various aberrations during shifting of the image stabilizing unit IS and to reduce the size and weight of the image stabilizing unit IS. Here, the focal length ft of the entire system is a focal length at the telephoto end of the zoom lens. If the focal length of the image stabilizing unit IS becomes larger so that |fis/ft| is higher than the upper limit of the expression (9), the shift amount of the image stabilizing unit IS needs to be larger and hinders the size and weight reductions. If the focal length of the entire system becomes smaller so that |fis/ft| is higher than the upper limit of the expression (9), the zoom ratio in the zoom lens becomes small.

On the other hand, if the focal length of the image stabilizing unit IS becomes smaller so that |fis/ft| is lower than the lower limit of the expression (9), the shift amount of the image stabilizing unit IS can be suppressed. However, the refractive power of the image stabilizing unit IS becomes too strong and it becomes difficult to correct various aberrations while the image stabilizing unit IS is not shifted and various aberrations such as eccentric coma during shifting. If the focal length of the entire system becomes larger so that |fis/ft| is lower than the lower limit of the expression (9), it becomes difficult to suppress the longitudinal chromatic aberration and the like at the telephoto end.

The expression (10) defines a condition regarding a difference between the average Abbe number vd_gave of lenses other than the resin layer in the image stabilizing unit IS and the Abbe number vd_r of the resin layer Grep so as to satisfactorily correct the longitudinal chromatic aberration generated in the image stabilizing unit IS and the eccentric chromatic aberration generated during shifting of the image stabilizing unit IS. If the difference is higher than the upper limit of the expression (10), the chromatic aberration generated in the image stabilizing unit IS can be suppressed. However, the difference in refractive power between the resin layer Grep and the base lens becomes smaller and it consequently becomes difficult to suppress a spherical aberration and coma while the image stabilizing unit IS is not shifted.

On the other hand, if the difference is lower than the lower limit of the expression (10), it is necessary to increase the difference in refractive power between the resin layer Grep and the base lens in order to satisfactorily suppress a chromatic aberration, and consequently, it becomes difficult to suppress eccentric coma during shifting of the image stabilizing unit IS. If the difference is lower than the lower limit of the expression (10), it becomes difficult to correct the chromatic aberration itself in the image stabilizing unit IS.

The numerical ranges of the expressions (2) to (10) may be set as follows:

$$20 \leq vd\_r \leq 40 \tag{2a}$$

$$1.50 \leq nd\_r \leq 1.70 \tag{3a}$$

$$0.005 \leq dr/Dis \leq 0.600 \tag{4a}$$

$$0.2 \leq |(1-\beta ist)\beta rt| \leq 4.0 \tag{5a}$$

$$|(R2+R1)/(R2-R1)| \leq 1.7 \tag{6a}$$

$$1.5 \leq D \max/D \min \leq 20.0 \tag{7a}$$

$$|Dstpw/OTDw| \leq 0.7 \tag{8a}$$

$$0.1 \leq fis/ft \leq 1.8 \tag{9a}$$

$$8.0 \leq |vd\_gave - vd\_r| \leq 55.0 \tag{10a}$$

The numerical ranges of the expressions (2) to (10) may be set as follows:

$$25 \leq vd\_r \leq 38 \tag{2b}$$

$$1.55 \leq nd\_r \leq 1.65 \tag{3b}$$

$$0.007 \leq dr/Dis \leq 0.400 \tag{4b}$$

$$0.3 \leq |(1-\beta ist)\beta rt| \leq 3.0 \tag{5b}$$

$$|(R2+R1)/(R2-R1)| \leq 1.5 \tag{6b}$$

$$2.0 \leq D \max/D \min \leq 15.0 \tag{7b}$$

$$|Dstpw/OTDw| \leq 0.65 \tag{8b}$$

$$0.15 \leq |fis/ft| \leq 1.50 \tag{9b}$$

$$10.0 \leq |vd\_gave - vd\_r| \leq 52.0 \tag{10b}$$

In each example, the resin layer Grep of the image stabilizing unit IS may have an optical surface (air contact surface) that contacts air on either the object side or the image side. If both surfaces on the object side and the image side of the resin layer Grep are cemented to glass, the chromatic aberration of the resin layer Grep cannot be sufficiently corrected. The air contact surface of the resin layer Grep may be aspherical. Using the aspherical surface can more satisfactorily correct eccentric coma during shifting of the image stabilizing unit IS.

In each example, from the viewpoint of size and weight reductions, the image stabilizing unit IS may be a single cemented lens in which at least one lens other than the resin layer Grep and the resin layer Grep are cemented.

In the example of the zoom lens, the zoom lens may consist of, in order from the object side to the image side, the first lens unit L1 having the positive refractive power, the second lens unit L2 having the negative refractive power, and the rear unit (L3 or subsequent) on the image side of the second lens unit L2, where the image stabilizing unit IS may be included in the second lens unit L2 or the rear unit. This structure can reduce the diameter of the image stabilizing unit IS while reducing the overall length of the zoom lens. The rear unit may include at least one lens unit.

In each example, the resin layer Grep may be molded by an ultraviolet curable resin. The ultraviolet curable resin can make thin the resin layer Grep promoting the size and weight reductions.

Each example can realize a high optical performance such as suppressing a chromatic aberration during shifting of the image stabilizing unit IS while the size and weight of the image stabilizing unit IS are reduced.

Numerical examples 1 to 5 corresponding to Examples 1 to 5 will now be illustrated. In each numerical example, a surface number i indicates the order of optical surfaces counted from the object side. r (mm) represents a radius of curvature of an i-th optical surface, and d (mm) represents a lens thickness or distance (air spacing) on the optical axis between the i-th surface and (i+1)-th surface. nd is a refractive index of an optical material between the i-th surface and the (i+1)-th plane for the d-line. vdi is an Abbe number based on the d-line of the optical material between the i-th surface and the (i+1)-th surface. The Abbe number vd is expressed as follows:

$$vd=(Nd-1)/(NF-NC)$$

where Nd, Nf, and NC are refractive indexes of the Fraunhofer line for the d-line (587.6 nm), F-line (486.1 nm), and C-line (656.3 nm), respectively.

In each numerical example, d, focal length, F-number, and half angle of view (°) are values in an in-focus state on an infinity object. "BF" (backfocus) is a distance on the optical axis from a final surface, which is a lens surface closest to the image plane of the entire lens system, to a paraxial image plane, expressed by an air conversion length. The "overall lens length" is a length obtained by adding the backfocus to a distance on the optical axis from the frontmost surface as a lens surface closest to the object of the entire lens system to the final surface.

An asterisk "*" attached to the surface number means that the surface is aspherical. The aspherical shape is expressed as follows:

$$X = \frac{H^2/R}{1 + \sqrt{1 - (1+K)(H/R)^2}} + A4H^4 + A6H^6 + A8H^8 + A10H^{10}$$

where X is a displacement amount from a surface apex in the optical axis direction, H is a height from the optical axis in the direction orthogonal to the optical axis, and a light traveling direction is set positive, R is a paraxial radius of curvature, K is a conical constant, and A4, A6, A8, and A10 are aspherical coefficients. "e-x" means "$\times 10^{-x}$."

Table 1 summarizes a relationship between the conditions of the expressions (1) to (10) and each example (numerical example). All of the zoom lenses $1a$ to $1e$ according to Examples 1 to 5 satisfy the conditions of the expressions (1) to (10) (or (1a) to (10a) and (1b) to (10b)).

Numerical Example 1

| UNIT: mm | | | | | |
|---|---|---|---|---|---|
| Surface Data | | | | | |
| Surface No. | r | d | nd | vd | Effective Diameter |
| 1 | 287.836 | 2.20 | 1.84666 | 23.8 | 75.07 |
| 2 | 117.040 | 8.77 | 1.49700 | 81.5 | 72.42 |
| 3 | −463.649 | 0.15 | | | 71.69 |
| 4 | 76.445 | 7.27 | 1.72916 | 54.7 | 67.41 |
| 5 | 288.757 | (Variable) | | | 66.52 |
| 6 | 130.630 | 1.40 | 1.88300 | 40.8 | 36.21 |
| 7 | 24.178 | 6.11 | | | 29.46 |
| 8 | −231.647 | 1.00 | 1.53775 | 74.7 | 28.71 |
| 9 | 43.461 | 0.10 | | | 26.53 |
| 10 | 37.552 | 3.58 | 1.85478 | 24.8 | 26.29 |
| 11 | 74.422 | 4.10 | | | 24.78 |
| 12 | −29.397 | 1.10 | 1.49700 | 81.5 | 24.36 |
| 13 | 560.309 | 2.50 | 1.85478 | 24.8 | 25.80 |
| 14 | −82.474 | (Variable) | | | 26.38 |
| 15(Diaphragm) | ∞ | (Variable) | | | 27.44 |
| 16 | 44.442 | 4.32 | 1.89286 | 20.4 | 29.70 |
| 17 | −8802.889 | 0.12 | | | 29.58 |
| 18 | 40.767 | 1.50 | 2.00100 | 29.1 | 29.23 |
| 19 | 23.094 | 11.28 | 1.49700 | 81.5 | 27.72 |
| 20 | −29.992 | 0.29 | | | 27.34 |
| 21 | −29.172 | 1.40 | 2.00069 | 25.5 | 27.15 |
| 22 | 474.342 | 2.01 | | | 28.12 |
| 23 | 84.351 | 5.21 | 1.49700 | 81.5 | 29.71 |
| 24 | −52.194 | 0.82 | | | 30.06 |
| 25* | −104.554 | 0.50 | 1.59022 | 30.1 | 30.09 |
| 26 | −77.348 | 1.30 | 1.48749 | 70.2 | 30.09 |
| 27 | 111.339 | (Variable) | | | 30.41 |
| 28 | 46.242 | 9.43 | 1.49700 | 81.5 | 36.90 |
| 29 | −58.476 | 0.15 | | | 37.04 |
| 30* | 63.823 | 0.16 | 1.59022 | 30.1 | 35.76 |
| 31 | 82.814 | 1.35 | 1.95906 | 17.5 | 35.69 |
| 32 | 46.540 | 5.00 | 2.00100 | 29.1 | 34.91 |
| 33 | 609.389 | (Variable) | | | 34.38 |
| 34 | 186.529 | 3.09 | 1.95906 | 17.5 | 32.70 |
| 35 | −171.732 | 0.15 | | | 32.13 |
| 36 | −324.395 | 1.10 | 1.77047 | 29.7 | 31.62 |
| 37 | 33.303 | (Variable) | | | 29.36 |
| 38* | −29.257 | 0.45 | 1.59022 | 30.1 | 28.94 |
| 39 | −25.615 | 1.60 | 1.72916 | 54.7 | 28.97 |
| 40 | −94.099 | (Variable) | | | 31.26 |
| 41 | 47.581 | 6.51 | 1.48749 | 70.2 | 40.90 |
| 42 | ∞ | (Variable) | | | 41.08 |
| Image Plane | ∞ | | | | |

-continued

| UNIT: mm |
| --- |

| ASPHERIC DATA |
| --- |

25th Surface

K = 0.00000e+000 A 4 = 1.28501e−006 A 6 = −9.97125e−010 A 8 = 7.44439e−012
A10 = −2.13750e−014 A12 = 1.80140e−017

30th Surface

K = 0.00000e+000 A 4 = −6.17655e−006 A 6 = −9.03755e−010 A 8 = −1.77689e−011
A10 = 4.08615e−014 A12 = −4.01447e−017

38th Surface

K = 0.00000e+000 A 4 = −6.43322e−006 A 6 = 1.45019e−008 A 8 = −1.53727e−010
A10 = 6.74684e−013 A12 = −1.13415e−015

Various Data
ZOOM RATIO 4.71

|  | WIDE-ANGLE | MIDDLE | TELEPHOTO |
| --- | --- | --- | --- |
| Focal Length: | 24.72 | 61.33 | 116.36 |
| FNO | 2.91 | 2.91 | 2.91 |
| Half Angle of View: (°) | 37.12 | 19.43 | 10.53 |
| Image Height | 21.64 | 21.64 | 21.64 |
| Overall lens length | 178.45 | 191.24 | 204.02 |
| BF | 14.59 | 14.59 | 14.59 |
| d 5 | 0.90 | 29.26 | 50.55 |
| d14 | 24.92 | 9.35 | 0.84 |
| d15 | 17.38 | 5.86 | 1.50 |
| d27 | 8.70 | 5.14 | 2.79 |
| d33 | 1.50 | 5.17 | 4.79 |
| d37 | 13.65 | 15.48 | 26.81 |
| d40 | 0.80 | 10.38 | 6.14 |
| d42 | 14.59 | 14.59 | 14.59 |
| Entrance Pupil Position | 36.26 | 88.83 | 157.67 |
| Exit Pupil Position | −107.74 | −89.47 | −70.91 |
| Front Principal Point Position | 55.98 | 114.02 | 115.66 |
| Rear Principal Point Position | −10.14 | −46.74 | −101.77 |

Lens Unit Data

| Lens Unit | Starting Surface | Focal Length: | Lens Structure Length | Front Principal Point Position | Rear Principal Point Position |
| --- | --- | --- | --- | --- | --- |
| 1 | 1 | 122.94 | 18.39 | 5.51 | −5.87 |
| 2 | 6 | −24.45 | 19.89 | 3.09 | −12.16 |
| 3 | 16 | 70.96 | 28.74 | −10.25 | −26.71 |
| 4 | 28 | 32.41 | 16.09 | 4.32 | −5.68 |
| 5 | 34 | −69.15 | 4.34 | 3.43 | 1.03 |
| 6 | 38 | −56.65 | 2.05 | −0.44 | −1.67 |
| 7 | 41 | 97.60 | 6.51 | 0.00 | −4.37 |

Single Lens Data

| Lens | Starting Surface | Focal Length: |
| --- | --- | --- |
| 1 | 1 | −234.35 |
| 2 | 2 | 188.98 |
| 3 | 4 | 140.56 |
| 4 | 6 | −33.81 |
| 5 | 8 | −67.97 |
| 6 | 10 | 84.87 |
| 7 | 12 | −56.17 |
| 8 | 13 | 84.26 |
| 9 | 16 | 49.54 |
| 10 | 18 | −55.58 |
| 11 | 19 | 28.24 |
| 12 | 21 | −27.42 |
| 13 | 23 | 65.71 |
| 14 | 25 | 500.22 |
| 15 | 26 | −93.41 |
| 16 | 28 | 53.56 |
| 17 | 30 | 470.09 |
| 18 | 31 | −112.84 |
| 19 | 32 | 50.11 |
| 20 | 34 | 93.62 |
| 21 | 36 | −39.15 |

-continued

| | UNIT: mm | |
|---|---|---|
| 22 | 38 | 333.28 |
| 23 | 39 | −48.75 |
| 24 | 41 | 97.60 |

Numerical Example 2

| | UNIT: mm | | | | |
|---|---|---|---|---|---|
| | | Surface Data | | | |
| Surface No. | r | d | nd | vd | Effective Diameter |
| 1 | 2087.789 | 2.20 | 2.00100 | 29.1 | 74.30 |
| 2 | 118.129 | 8.40 | 1.49700 | 81.5 | 70.56 |
| 3 | −432.633 | 0.15 | | | 69.80 |
| 4 | 155.344 | 5.06 | 1.49700 | 81.5 | 65.50 |
| 5 | −1452.229 | 0.00 | | | 64.65 |
| 6 | 78.029 | 5.78 | 1.81600 | 46.6 | 58.71 |
| 7 | 357.852 | (Variable) | | | 58.00 |
| 8 | 336.817 | 1.40 | 1.88300 | 40.8 | 44.02 |
| 9 | 29.285 | 7.33 | | | 35.80 |
| 10 | −181.413 | 1.00 | 1.59522 | 67.7 | 35.46 |
| 11 | 67.132 | 0.11 | | | 33.57 |
| 12 | 43.305 | 3.00 | 1.85478 | 24.8 | 33.02 |
| 13 | 69.829 | 5.87 | | | 32.04 |
| 14 | −37.040 | 1.10 | 1.49700 | 81.5 | 31.71 |
| 15 | 176.336 | 0.35 | | | 31.10 |
| 16 | 336.419 | 3.27 | 1.85478 | 24.8 | 31.10 |
| 17 | −75.335 | (Variable) | | | 30.99 |
| 18(Diaphragm) | ∞ | (Variable) | | | 30.47 |
| 19 | 51.100 | 4.23 | 1.77830 | 23.9 | 33.04 |
| 20 | 646.565 | 12.18 | | | 32.94 |
| 21 | 31.714 | 1.50 | 2.00069 | 25.5 | 31.80 |
| 22 | 22.464 | 12.02 | 1.49700 | 81.5 | 30.03 |
| 23 | −39.484 | 1.40 | 1.92286 | 18.9 | 29.28 |
| 24 | −574.242 | 1.87 | | | 29.40 |
| 25* | −183.377 | 0.20 | 1.56650 | 37.6 | 29.41 |
| 26 | −156.034 | 4.62 | 1.92286 | 18.9 | 29.42 |
| 27 | −32.348 | 1.30 | 1.84666 | 23.8 | 29.57 |
| 28 | 162.389 | (Variable) | | | 30.61 |
| 29* | 113.215 | 0.05 | 1.59022 | 30.1 | 36.97 |
| 30 | 131.870 | 5.06 | 1.49700 | 81.5 | 37.13 |
| 31 | −120.504 | 0.14 | | | 38.00 |
| 32 | 65.847 | 8.24 | 1.77250 | 49.6 | 40.03 |
| 33 | −71.507 | (Variable) | | | 39.92 |
| 34 | 538.020 | 4.63 | 1.92286 | 18.9 | 35.17 |
| 35 | −59.131 | 1.10 | 1.73800 | 32.3 | 34.60 |
| 36 | 42.302 | (Variable) | | | 31.63 |
| 37* | −36.742 | 0.45 | 1.59022 | 30.1 | 30.74 |
| 38 | −30.526 | 1.60 | 1.72916 | 54.7 | 30.75 |
| 39 | −148.485 | (Variable) | | | 32.56 |
| 40 | 107.754 | 5.26 | 1.49700 | 81.5 | 39.78 |
| 41 | −117.305 | (Variable) | | | 40.19 |
| Image Plane | ∞ | | | | |

| ASPHERIC DATA |
|---|

25th Surface

K = 0.00000e+000 A 4 = 3.17809e−007 A 6 = 6.04584e−010 A 8 = −1.25210e−012
A10 = −1.01467e−014 A12 = 2.97341e−017

29th Surface

K = 0.00000e+000 A 4 = −5.60367e−006 A 6 = 1.76853e−009 A 8 = −7.01013e−012
A10 = 1.89743e−014 A12 = −1.92142e−017

37th Surface

K = 0.00000e+000 A 4 = −5.62020e−006 A 6 = −1.34754e−009 A 8 = −2.04562e−011
A10 = 3.24662e−014 A12 = −6.83028e−017

-continued

| UNIT: mm |
| --- |

| Various Data<br>ZOOM RATIO 4.71 | | | |
| --- | --- | --- | --- |
| | WIDE-ANGLE | MIDDLE | TELEPHOTO |
| Focal Length: | 24.73 | 39.98 | 116.36 |
| FNO | 2.91 | 2.91 | 2.91 |
| Half Angle of View: (°) | 37.39 | 28.42 | 10.53 |
| Image Height | 21.64 | 21.64 | 21.64 |
| Overall lens length | 213.46 | 213.46 | 213.46 |
| BF | 13.81 | 13.81 | 13.81 |
| d 7 | 0.90 | 10.57 | 41.17 |
| d17 | 40.70 | 31.03 | 0.43 |
| d18 | 19.51 | 10.63 | 3.00 |
| d28 | 10.18 | 6.80 | 2.30 |
| d33 | 3.34 | 1.50 | 4.26 |
| d36 | 13.36 | 17.76 | 27.79 |
| d39 | 0.80 | 10.50 | 9.84 |
| d41 | 13.81 | 13.81 | 13.81 |
| Entrance Pupil Position | 42.40 | 58.24 | 130.41 |
| Exit Pupil Position | −148.93 | −125.59 | −94.68 |
| Front Principal Point Position | 63.37 | 86.76 | 121.98 |
| Rear Principal Point Position | −10.91 | −26.16 | −102.54 |

| Lens Unit Data | | | | | |
| --- | --- | --- | --- | --- | --- |
| Lens<br>Unit | Starting<br>Surface | Focal<br>Length: | Lens Structure<br>Length | Front Principal<br>Point Position | Rear Principal<br>Point Position |
| 1 | 1 | 106.16 | 21.59 | 11.21 | −1.93 |
| 2 | 8 | −28.55 | 23.42 | 2.16 | −17.17 |
| 3 | 19 | 81.72 | 39.31 | −24.35 | −40.92 |
| 4 | 29 | 33.65 | 13.49 | 4.76 | −3.70 |
| 5 | 34 | −80.05 | 5.73 | 3.64 | 0.58 |
| 6 | 37 | −64.06 | 2.05 | −0.30 | −1.51 |
| 7 | 40 | 113.89 | 5.26 | 1.70 | −1.85 |

| Single Lens Data | | |
| --- | --- | --- |
| Lens | Starting Surface | Focal Length: |
| 1 | 1 | −125.16 |
| 2 | 2 | 187.66 |
| 3 | 4 | 282.66 |
| 4 | 6 | 121.16 |
| 5 | 8 | −36.40 |
| 6 | 10 | −82.20 |
| 7 | 12 | 126.77 |
| 8 | 14 | −61.49 |
| 9 | 16 | 72.27 |
| 10 | 19 | 71.07 |
| 11 | 21 | −83.76 |
| 12 | 22 | 30.79 |
| 13 | 23 | −46.00 |
| 14 | 25 | 1842.37 |
| 15 | 26 | 43.44 |
| 16 | 27 | −31.76 |
| 17 | 29 | 1354.57 |
| 18 | 30 | 127.54 |
| 19 | 32 | 45.57 |
| 20 | 34 | 57.94 |
| 21 | 35 | −33.26 |
| 22 | 37 | 297.68 |
| 23 | 38 | −53.00 |
| 24 | 40 | 113.89 |

Numerical Example 3

| | | UNIT: mm | | | |
|---|---|---|---|---|---|
| | | Surface Data | | | |
| Surface No. | r | d | nd | vd | Effective Diameter |
| 1 | 304.000 | 2.20 | 1.84666 | 23.8 | 71.53 |
| 2 | 92.955 | 9.24 | 1.49700 | 81.5 | 65.89 |
| 3 | −371.952 | 0.15 | | | 64.74 |
| 4 | 76.828 | 5.61 | 1.83481 | 42.7 | 56.54 |
| 5 | 364.502 | (Variable) | | | 55.27 |
| 6 | 421.524 | 1.40 | 1.88300 | 40.8 | 46.29 |
| 7 | 30.091 | 7.99 | | | 37.33 |
| 8 | −159.885 | 1.00 | 1.49700 | 81.5 | 36.91 |
| 9 | 51.475 | 0.08 | | | 34.34 |
| 10 | 43.008 | 3.06 | 2.05090 | 26.9 | 34.07 |
| 11 | 67.114 | 6.21 | | | 33.04 |
| 12 | −38.079 | 1.10 | 1.49700 | 81.5 | 32.68 |
| 13 | 327.741 | 4.59 | 1.85478 | 24.8 | 32.00 |
| 14 | −81.468 | (Variable) | | | 31.67 |
| 15(Diaphragm) | ∞ | (Variable) | | | 32.41 |
| 16 | 54.786 | 3.49 | 1.92286 | 18.9 | 34.29 |
| 17 | 177.454 | 8.45 | | | 34.14 |
| 18 | 30.263 | 1.50 | 2.00069 | 25.5 | 33.97 |
| 19 | 22.637 | 10.55 | 1.49700 | 81.5 | 32.06 |
| 20 | −147.905 | 0.13 | | | 31.31 |
| 21 | −282.889 | 1.40 | 1.80810 | 22.8 | 31.07 |
| 22 | 58.671 | 1.50 | | | 30.32 |
| 23* | 56.597 | 0.05 | 1.59022 | 30.1 | 30.43 |
| 24 | 52.518 | 5.69 | 1.49700 | 81.5 | 30.39 |
| 25 | −75.427 | 2.44 | | | 30.41 |
| 26 | −47.713 | 1.30 | 1.80810 | 22.8 | 30.40 |
| 27 | 159.626 | (Variable) | | | 31.74 |
| 28* | 84.668 | 0.07 | 1.59022 | 30.1 | 38.87 |
| 29 | 106.190 | 5.61 | 1.49700 | 81.5 | 39.01 |
| 30 | −99.010 | 0.15 | | | 39.77 |
| 31 | 84.097 | 7.77 | 1.90043 | 37.4 | 41.84 |
| 32 | −75.592 | (Variable) | | | 41.78 |
| 33 | 293.202 | 3.43 | 1.98612 | 16.5 | 36.51 |
| 34 | −121.711 | 0.15 | | | 35.94 |
| 35 | −172.611 | 1.10 | 1.90043 | 37.4 | 35.22 |
| 36 | 43.474 | (Variable) | | | 32.84 |
| 37* | −30.478 | 0.45 | 1.59022 | 30.1 | 32.11 |
| 38 | −27.469 | 1.60 | 1.72916 | 54.7 | 32.14 |
| 39 | −70.075 | (Variable) | | | 34.71 |
| 40 | 65.669 | 5.25 | 1.72916 | 54.7 | 43.05 |
| 41 | ∞ | (Variable) | | | 43.06 |
| Image Plane | ∞ | | | | |

ASPHERIC DATA

23rd Surface

K = 0.00000e+000 A 4 = −1.56777e−006 A 6 = −2.16556e−009 A 8 = 6.57664e−012
A10 = −1.33254e−014 A12 = 1.71769e−017
28th Surface K = 0.00000e+000 A 4 = −5.98706e−006 A 6 = 4.16976e−009 A 8 = −1.36129e−011
A10 = 2.95803e−014 A12 = −2.54789e−017
37th Surface K = 0.00000e+000 A 4 = −2.64638e−006 A 6 = 2.34537e−009 A 8 = −3.38245e−011
A10 = 9.90165e−014 A12 = −1.71434e−016

Various Data
ZOOM RATIO 4.71

| | WIDE-ANGLE | MIDDLE | TELEPHOTO |
|---|---|---|---|
| Focal Length: | 24.72 | 39.97 | 116.37 |
| FNO | 2.91 | 2.91 | 2.91 |
| Half Angle of View: (°) | 37.12 | 28.42 | 10.53 |
| Image Height | 21.64 | 21.64 | 21.64 |
| Overall lens length | 208.46 | 208.46 | 208.46 |
| BF | 13.50 | 13.50 | 13.50 |
| d 5 | 0.90 | 9.49 | 38.99 |
| d14 | 38.94 | 30.35 | 0.85 |
| d15 | 22.77 | 12.22 | 1.50 |
| d27 | 8.95 | 6.28 | 2.34 |

-continued

| UNIT: mm | | | |
|---|---|---|---|
| d32 | 3.41 | 1.62 | 4.50 |
| d36 | 14.49 | 18.45 | 28.45 |
| d39 | 0.80 | 11.86 | 13.62 |
| d41 | 13.50 | 13.50 | 13.50 |
| Entrance Pupil Position | 41.45 | 55.51 | 122.04 |
| Exit Pupil Position | −253.62 | −186.07 | −135.48 |
| Front Principal Point Position | 63.88 | 87.48 | 147.51 |
| Rear Principal Point Position | −11.22 | −26.47 | −102.87 |

| Lens Unit Data | | | | | |
|---|---|---|---|---|---|
| Lens Unit | Starting Surface | Focal Length: | Lens Structure Length | Front Principal Point Position | Rear Principal Point Position |
| 1 | 1 | 110.47 | 17.20 | 7.03 | −3.52 |
| 2 | 6 | −30.54 | 25.43 | 1.82 | −18.95 |
| 3 | 16 | 90.23 | 36.48 | −35.10 | −44.29 |
| 4 | 28 | 31.24 | 13.60 | 4.81 | −3.51 |
| 5 | 33 | −70.22 | 4.68 | 3.27 | 0.78 |
| 6 | 37 | −72.71 | 2.05 | −0.81 | −2.04 |
| 7 | 40 | 90.06 | 5.25 | 0.00 | −3.04 |

| Single Lens Data | | |
|---|---|---|
| Lens | Starting Surface | Focal Length: |
| 1 | 1 | −158.91 |
| 2 | 2 | 150.63 |
| 3 | 4 | 115.58 |
| 4 | 6 | −36.76 |
| 5 | 8 | −78.22 |
| 6 | 10 | 106.98 |
| 7 | 12 | −68.57 |
| 8 | 13 | 76.73 |
| 9 | 16 | 84.72 |
| 10 | 18 | −99.56 |
| 11 | 19 | 40.33 |
| 12 | 21 | −60.02 |
| 13 | 23 | −1240.33 |
| 14 | 24 | 63.23 |
| 15 | 26 | −45.33 |
| 16 | 28 | 706.86 |
| 17 | 29 | 104.04 |
| 18 | 31 | 45.25 |
| 19 | 33 | 87.58 |
| 20 | 35 | −38.47 |
| 21 | 37 | 446.65 |
| 22 | 38 | −62.96 |
| 23 | 40 | 90.06 |

45

Numerical Example 4

| UNIT: mm | | | | | |
|---|---|---|---|---|---|
| Surface Data | | | | | |
| Surface No. | r | d | nd | vd | Effective Diameter |
| 1 | 70.752 | 6.52 | 1.90043 | 37.4 | 56.88 |
| 2 | 440.500 | 0.15 | | | 56.29 |
| 3 | 57.565 | 9.57 | 1.49700 | 81.5 | 52.51 |
| 4 | −332.389 | 2.00 | 1.88300 | 40.8 | 50.73 |
| 5 | 84.915 | 0.15 | | | 47.13 |
| 6 | 50.200 | 6.94 | 1.49700 | 81.5 | 45.81 |
| 7 | 334.045 | 0.15 | | | 44.29 |
| 8 | 135.929 | 2.00 | 1.67270 | 32.1 | 43.09 |
| 9 | 32.936 | 2.62 | | | 38.36 |
| 10 | 49.461 | 4.03 | 1.72916 | 54.7 | 38.26 |
| 11 | 142.439 | (Variable) | | | 37.51 |
| 12(Diaphragm) | ∞ | 2.30 | | | 36.57 |
| 13 | −555.457 | 1.68 | 1.92286 | 18.9 | 35.07 |
| 14 | −154.056 | 1.30 | 1.59522 | 67.7 | 34.74 |
| 15 | 38.151 | (Variable) | | | 32.08 |
| 16* | 414.834 | 0.50 | 1.59022 | 30.1 | 29.58 |

-continued

| UNIT: mm | | | | | |
|---|---|---|---|---|---|
| 17 | −615.628 | 1.00 | 1.82522 | 41.7 | 29.57 |
| 18 | 78.957 | (Variable) | | | 29.25 |
| 19 | 41.210 | 11.92 | 1.59522 | 67.7 | 32.94 |
| 20 | −28.912 | 1.30 | 1.66565 | 35.6 | 33.86 |
| 21 | 298.910 | 0.19 | | | 36.43 |
| 22 | 197.707 | 1.80 | 1.80810 | 22.8 | 36.77 |
| 23 | 32.848 | 11.15 | 1.88300 | 40.8 | 38.82 |
| 24 | −92.968 | 1.75 | | | 39.36 |
| 25 | −59.032 | 1.80 | 1.57197 | 38.1 | 39.36 |
| 26 | 35.777 | 11.74 | 1.99202 | 27.0 | 42.46 |
| 27 | −100.164 | 8.69 | | | 42.17 |
| 28* | −50.963 | 2.00 | 1.76802 | 49.2 | 37.57 |
| 29 | −3568.112 | (Variable) | | | 38.81 |
| Image Plane | ∞ | | | | |

ASPHERIC DATA

16th Surface

K = 0.00000e+000 A 4 = 1.59786e−007 A 6 = 1.73424e−009 A 8 = −1.56292e−012
28th Surface K = 0.00000e+000 A 4 = −1.01224e−005 A 6 = 2.28729e−008 A 8 = −1.22091e−010
A10 = 2.83964e−013 A12 = −2.41602e−016

| | |
|---|---|
| Focal Length: | 82.47 |
| FNO | 1.45 |
| Half Angle of View: (°) | 14.70 |
| Image Height | 21.64 |
| Overall lens length | 126.52 |
| BF | 13.50 |
| d11 | 2.50 |
| d15 | 16.06 |
| d18 | 1.20 |
| d29 | 13.50 |
| Entrance Pupil Position | 40.78 |
| Exit Pupil Position | −67.48 |
| Front Principal Point Position | 39.26 |
| Rear Principal Point Position | −68.97 |

| Lens Unit Data | | | | | |
|---|---|---|---|---|---|
| Lens Unit | Starting Surface | Focal Length: | Lens Structure Length | Front Principal Point Position | Rear Principal Point Position |
| 1 | 1 | 79.48 | 34.14 | −7.82 | −27.66 |
| 2 | 12 | −66.01 | 5.28 | 3.91 | −0.07 |
| 3 | 16 | −106.39 | 1.50 | 0.97 | 0.11 |
| 4 | 19 | 39.11 | 52.34 | 1.11 | −28.22 |

| Single Lens Data | | |
|---|---|---|
| Lens | Starting Surface | Focal Length: |
| 1 | 1 | 92.84 |
| 2 | 3 | 99.54 |
| 3 | 4 | −76.43 |
| 4 | 6 | 117.91 |
| 5 | 8 | −65.13 |
| 6 | 10 | 102.05 |
| 7 | 13 | 230.54 |
| 8 | 14 | −51.24 |
| 9 | 16 | 419.97 |
| 10 | 17 | −84.75 |
| 11 | 19 | 30.48 |
| 12 | 20 | −39.54 |
| 13 | 22 | −48.99 |
| 14 | 23 | 28.68 |
| 15 | 25 | −38.68 |
| 16 | 26 | 27.77 |
| 17 | 28 | −67.34 |

Numerical Example 5

| | UNIT: mm | | | | |
|---|---|---|---|---|---|

Surface Data

| Surface No. | r | d | nd | vd | Effective Diameter |
|---|---|---|---|---|---|
| 1 | 88.418 | 1.50 | 1.88300 | 40.8 | 58.70 |
| 2 | 63.666 | 8.74 | 1.49700 | 81.5 | 57.43 |
| 3 | −833.690 | (Variable) | | | 57.10 |
| 4* | −106.403 | 1.00 | 1.59022 | 30.1 | 32.47 |
| 5 | −64.250 | 1.10 | 1.72916 | 54.7 | 32.47 |
| 6 | 29.236 | 4.74 | 1.76200 | 40.1 | 32.73 |
| 7 | 79.904 | 1.26 | | | 32.74 |
| 8 | 94.393 | 4.99 | 1.76182 | 26.5 | 33.09 |
| 9 | −71.324 | 0.15 | | | 33.14 |
| 10 | 90.907 | 5.93 | 1.49700 | 81.5 | 32.03 |
| 11 | −45.508 | 1.25 | 2.05090 | 26.9 | 31.47 |
| 12 | 896.670 | 1.06 | | | 31.34 |
| 13(Diaphragm) | ∞ | (Variable) | | | 31.31 |
| 14 | 126.596 | 1.30 | 2.05090 | 26.9 | 34.71 |
| 15 | 52.713 | 7.76 | 1.58313 | 59.4 | 34.97 |
| 16 | −72.568 | 0.15 | | | 35.80 |
| 17 | 67.589 | 3.92 | 1.72916 | 54.7 | 36.93 |
| 18 | −1930.147 | (Variable) | | | 36.79 |
| 19 | 509.219 | 1.15 | 1.53775 | 74.7 | 29.60 |
| 20 | 28.124 | (Variable) | | | 28.85 |
| 21 | −57.869 | 6.04 | 1.59270 | 35.3 | 31.10 |
| 22 | −22.224 | 1.60 | 1.49700 | 81.5 | 31.77 |
| 23 | −4514.292 | (Variable) | | | 34.70 |
| Image Plane | ∞ | | | | |

ASPHERIC DATA

4th Surface

K = 0.00000e+000 A 4 = 6.85519e−007 A 6 = 4.19594e−009 A 8 = −4.15125e−011
A10 = 2.06560e−013 A12 = −3.86264e−016

Various Data
ZOOM RATIO 3.76

| | WIDE-ANGLE | MIDDLE | TELEPHOTO |
|---|---|---|---|
| Focal Length: | 103.16 | 216.79 | 387.89 |
| FNO | 4.64 | 6.50 | 7.30 |
| Half Angle of View: (°) | 11.84 | 5.70 | 3.19 |
| Image Height | 21.64 | 21.64 | 21.64 |
| Overall lens length | 176.10 | 235.23 | 288.59 |
| BF | 15.98 | 50.92 | 63.01 |
| d 3 | 2.11 | 61.24 | 114.60 |
| d13 | 61.57 | 37.67 | 27.84 |
| d18 | 29.18 | 15.57 | 1.86 |
| d20 | 13.60 | 16.18 | 27.63 |
| d23 | 15.98 | 50.92 | 63.01 |
| Entrance Pupil Position | 24.02 | 127.92 | 345.02 |
| Exit Pupil Position | −64.37 | −51.72 | −52.41 |
| Front Principal Point Position | −5.27 | −113.18 | −570.71 |
| Rear Principal Point Position | −87.18 | −165.87 | −324.88 |

Lens Unit Data

| Lens Unit | Starting Surface | Focal Length: | Lens Structure Length | Front Principal Point Position | Rear Principal Point Position |
|---|---|---|---|---|---|
| 1 | 1 | 219.80 | 10.24 | −0.19 | −6.85 |
| 2 | 4 | −225.92 | 21.49 | 4.50 | −8.67 |
| 3 | 14 | 53.78 | 13.13 | 5.57 | −2.43 |
| 4 | 19 | −55.40 | 1.15 | 0.79 | 0.04 |
| 5 | 21 | −176.88 | 7.64 | −2.98 | −7.96 |

Single Lens Data

| Lens | Starting Surface | Focal Length: |
|---|---|---|
| 1 | 1 | −265.09 |
| 2 | 2 | 119.40 |
| 3 | 4 | 272.37 |
| 4 | 5 | −27.42 |
| 5 | 6 | 58.15 |

-continued

| UNIT: mm | | |
| --- | --- | --- |
| 6 | 8 | 54.03 |
| 7 | 10 | 61.91 |
| 8 | 11 | −41.18 |
| 9 | 14 | −86.73 |
| 10 | 15 | 53.58 |
| 11 | 17 | 89.63 |
| 12 | 19 | −55.40 |
| 13 | 21 | 57.26 |
| 14 | 22 | −44.94 |

TABLE 1

| Conditional Expression | Ex. 1 | Ex. 2 | Ex. 3 | Ex. 4 | Ex. 5 |
| --- | --- | --- | --- | --- | --- |
| (1) $-0.95 \leq \text{fis/fr} < 0$ | −0.229 | −0.066 | −0.054 | −0.253 | −0.224 |
| (2) $15 \leq \text{vd\_r} \leq 40$ | 30.099 | 37.600 | 30.099 | 30.099 | 30.099 |
| (3) $1.50 \leq \text{nd\_r} \leq 1.75$ | 1.590 | 1.567 | 1.590 | 1.590 | 1.590 |
| (4) $0.001 \leq \text{dr/Dis} \leq 0.850$ | 0.278 | 0.033 | 0.009 | 0.333 | 0.146 |
| (5) $0.1 \leq |(1-\beta\text{ist})\beta\text{rt}| \leq 5.0$ | 0.709 | 0.670 | 1.298 | 0.391 | 2.775 |
| (6) $|(R2 + R1)/(R2 - R1)| \leq 2.0$ | 0.031 | 0.061 | 0.143 | 1.470 | 0.142 |
| (7) $1.1 \leq \text{Dmax/Dmin} \leq 30.0$ | 10.549 | 2.513 | 6.340 | 13.736 | 9.681 |
| (8) $|\text{Dstpw/OTDw}| \leq 0.8$ | 0.248 | 0.247 | 0.604 | 0.169 | 0.122 |
| (9) $0.05 \leq |\text{fis/ft}| \leq 2.00$ | 0.986 | 1.038 | 0.572 | 1.290 | 0.157 |
| (10) $5.0 \leq |\text{vd\_gave} - \text{vd\_r}| \leq 60.0$ | 40.131 | 16.260 | 51.441 | 11.621 | 17.291 |
| fis | −114.715 | −120.756 | 66.559 | −106.386 | −61.089 |
| fr | 500.217 | 1842.366 | −1240.333 | 419.969 | 272.375 |
| vd_r | 30.099 | 37.600 | 30.099 | 30.099 | 30.099 |
| nd_r | 1.590 | 1.567 | 1.590 | 1.590 | 1.590 |
| dr | 0.500 | 0.200 | 0.050 | 0.500 | 1.000 |
| Dis | 1.800 | 6.117 | 5.737 | 1.500 | 6.841 |
| βist | −0.239 | −0.389 | −0.138 | −4.846 | −1.747 |
| βrt | −0.572 | −0.482 | 1.140 | −0.067 | −1.010 |
| R2 | 111.339 | 162.389 | −75.427 | 78.957 | −106.403 |
| R1 | −104.554 | −183.377 | 56.597 | 414.834 | 79.904 |
| Dmax | 0.500 | 0.200 | 0.317 | 0.500 | 1.000 |
| Dmin | 0.047 | 0.080 | 0.050 | 0.036 | 0.103 |
| Dstpw | 44.321 | 52.702 | 125.983 | 21.337 | 21.486 |
| OTDw | 178.451 | 213.459 | 208.457 | 126.523 | 176.099 |
| ft | 116.362 | 116.355 | 116.371 | 82.475 | 387.894 |
| vd_gave | 70.230 | 21.340 | 81.540 | 41.721 | 47.390 |

Figure 21:
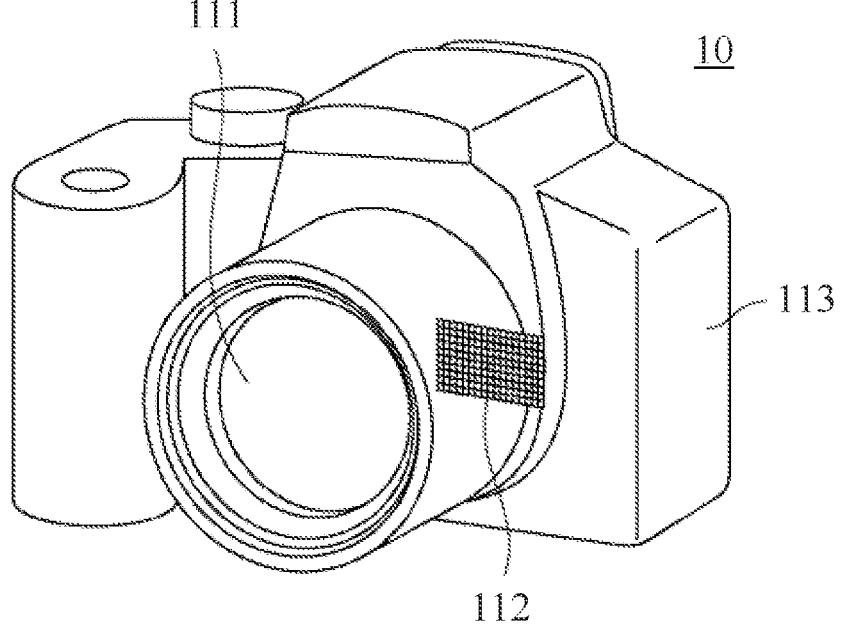
FIG. 21 illustrates an image pickup apparatus that includes the zoom lens according to each example.

FIG. 21 illustrates a digital still camera 10 as an image pickup apparatus using one of the lenses (1a to 1e) according to each example for an image pickup optical system. In FIG. 21, reference numeral 113 denotes a camera body, and reference numeral 111 denotes an imaging optical system. Reference numeral 112 denotes an image sensor (photoelectric conversion element) such as a CCD sensor or a CMOS sensor, which is built in the camera body 113 and receives an optical image formed by the imaging optical system 111 to capture an image (photoelectric conversion). The camera body 113 may be a single-lens reflex camera having a quick turn mirror, or a so-called mirrorless camera having no quick turn mirror.

Each example can provide the image pickup apparatus that includes a small and lightweight lens barrel accommodating the imaging optical system and has a high optical performance even during shifting of the image stabilizing unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-082159, filed on May 14, 2021, which is hereby incorporated by reference herein in its entirety.

What is claimed is:

1. An optical system comprising, in order from an object side to an image side:

a first lens unit having a positive refractive power;

a second lens unit having a negative refractive power; and a rear unit that includes at least one lens unit, wherein each distance between adjacent lens units changes during zooming, wherein the rear unit consists of, in order from the object side to the image side, a third lens unit having a positive refractive power, a fourth lens unit having a positive refractive power, a fifth lens unit having a negative refractive power, a sixth lens unit having a negative refractive power, and a seventh lens unit having a positive refractive power wherein the third lens unit includes a movable unit, wherein the movable unit is movable in a direction eccentric to an optical axis, wherein the movable unit includes a resin layer and a lens cemented together, wherein the optical system includes a plurality of positive lenses and a plurality of negative lenses, which are disposed on an image side of the movable unit, wherein the resin layer is UV curable resin, and wherein the following conditions are satisfied:

$$-0.30 \leq fis/fr \leq -0.05$$

$$0.1 \leq |(1-\beta ist)\beta rt| \leq 5.0$$

where fr is a focal length of the resin layer, and fis is a focal length of the movable unit, where while a focal length of the optical system is maximum, $\beta$ist is a lateral magnification of the movable unit, and $\beta$rt is a combined lateral magnification of all lenses on the image side of the movable unit.

2. The optical system according to claim 1, wherein the following condition is satisfied:

$$15 \leq vd\_r \leq 40$$

where vd_r is an Abbe number of the resin layer based on d-line.

3. The optical system according to claim 1, wherein the following condition is satisfied:

$$1.50 \leq nd\_r \leq 1.75$$

where nd_r is a refractive index of the resin layer for d-line.

4. The optical system according to claim 1, wherein the following condition is satisfied:

$$0.001 \leq dr/Dis \leq 0.850$$

where dr is a thickness on the optical axis of the resin layer, and Dis is a thickness on the optical axis of the movable unit.

5. The optical system according to claim 1, wherein the following condition is satisfied:

$$(R2+R1)/(R2-R1)| \leq 2.0$$

where R1 is a radius of curvature of a lens surface closest to an object in the movable unit, and R2 is a radius of curvature of a lens surface closest to an image plane in the movable unit.

6. The optical system according to claim 1, wherein the following condition is satisfied:

$$1.1 \leq D\ max/D\ min \leq 30.0$$

where Dmax is a maximum thickness in an optical axis direction of the resin layer, and Dmin is a minimum thickness in the optical axis direction of the resin layer.

7. The optical system according to claim 1, further comprising a diaphragm disposed on an object side of the movable unit, wherein the following condition is satisfied:

$$|Dstpw/OTDw| \leq 0.8$$

where while a focal length of the optical system is minimum, Dstpw is a distance on the optical axis from the diaphragm to the movable unit, and OTDw is a distance on the optical axis from a lens surface closest to an object in the optical system to an image plane.

8. The optical system according to claim 1, wherein the following condition is satisfied:

$$0.05 \leq |fis/ft| \leq 2.00$$

where ft is a maximum focal length of the optical system.

9. The optical system according to claim 1, wherein the following condition is satisfied:

$$5.0 \leq |vd\_gave-vd\_r| \leq 60.0$$

where vd_r is an Abbe number of the resin layer based on d-line and vd_gave is an average Abbe number of all lenses other than the resin layer included in the movable unit.

10. The optical system according to claim 1, wherein the resin layer includes an optical surface that contacts air.

11. The optical system according to claim 10, wherein the optical surface is aspherical.

12. The optical system according to claim 1, wherein the movable unit includes the resin layer and at least one lens cemented together.

13. The optical system according to claim 1, wherein the movable unit is moved in image stabilization.

14. The optical system according to claim 1, wherein the following condition is satisfied:

$$0.1 \leq |(1-\beta ist)\beta rt| \leq 0.709.$$

15. An image pickup apparatus comprising:

an optical system; and an image sensor configured to image an object via the optical system, wherein the optical system comprises, in order from an object side to an image side;

a first lens unit having a positive refractive power;

a second lens unit having a negative refractive power; and a rear unit that includes at least one lens unit, wherein each distance between adjacent lens units changes during zooming, wherein the rear unit consists of, in order from the object side to the image side, a third lens unit having a positive refractive power, a fourth lens unit having a positive refractive power, a fifth lens unit having a negative refractive power, a sixth lens unit having a negative refractive power, and a seventh lens unit having a positive refractive power wherein the third lens unit includes a movable unit, wherein the movable unit is movable in a direction eccentric to an optical axis, wherein the movable unit includes a resin layer and a lens cemented together, wherein the optical system includes a plurality of positive lenses and a plurality of negative lenses, which are disposed on the image side of the movable unit, wherein the resin layer is UV curable resin, and wherein the following conditions are satisfied:

$$-0.30 \leq fis/fr \leq -0.05$$

$$0.1 \leq |(1-\beta ist)\beta rt| \leq 5.0$$

where fr is a focal length of the resin layer, and fis is a focal length of the movable unit, where while a focal length of the optical system is maximum, $\beta$ist is a lateral magnification of the movable unit, and $\beta$rt is a combined lateral magnification of all lenses on the image side of the movable unit.

* * * * *